(12) United States Patent
Furukawa

(10) Patent No.: US 9,917,692 B2
(45) Date of Patent: Mar. 13, 2018

(54) KEY EXCHANGE SYSTEM, KEY EXCHANGE METHOD, KEY EXCHANGE DEVICE, CONTROL METHOD THEREOF, AND RECORDING MEDIUM FOR STORING CONTROL PROGRAM

(71) Applicant: NEC CORPORATION, Tokyo (JP)

(72) Inventor: Jun Furukawa, Tokyo (JP)

(73) Assignee: NEC CORPORATION, Minato-ky, Tokyo (JP)

( * ) Notice: Subject to any disclaimer, the term of this patent is extended or adjusted under 35 U.S.C. 154(b) by 0 days.

(21) Appl. No.: 15/313,124

(22) PCT Filed: May 20, 2015

(86) PCT No.: PCT/JP2015/002540
§ 371 (c)(1),
(2) Date: Nov. 22, 2016

(87) PCT Pub. No.: WO2015/182076
PCT Pub. Date: Dec. 3, 2015

(65) Prior Publication Data
US 2017/0187524 A1    Jun. 29, 2017

(30) Foreign Application Priority Data
May 26, 2014 (JP) ................................. 2014-108626

(51) Int. Cl.
*H04L 29/06* (2006.01)
*H04L 9/08* (2006.01)
*H04L 9/14* (2006.01)

(52) U.S. Cl.
CPC ............ *H04L 9/0822* (2013.01); *H04L 9/08* (2013.01); *H04L 9/0838* (2013.01); *H04L 9/14* (2013.01);
(Continued)

(58) Field of Classification Search
CPC .............................. H04L 63/06; H04L 63/061
See application file for complete search history.

(56) References Cited

U.S. PATENT DOCUMENTS

| 6,898,288 B2* | 5/2005 | Chui | H04K 1/00 380/278 |
| 2010/0290627 A1* | 11/2010 | Tsuji | H04L 9/0825 380/282 |
| 2012/0204032 A1* | 8/2012 | Wilkins | H04L 9/006 713/170 |

OTHER PUBLICATIONS

Brian A. LaMacchia, et al., "Stronger Security of Authenticated Key Exchange" Provable Security, Lecture Notes in Computer Science, 2007, pp. 1-16, vol. 4784.
(Continued)

*Primary Examiner* — Izunna Okeke
(74) *Attorney, Agent, or Firm* — Sughrue Mion, PLLC

(57) ABSTRACT

A key exchange device includes an initial setup unit that generates a verification key that serves as a public key and a signature key based on a discretionary random tape, a session identifier based on a first random tape, and a secret key based on a second random tape; an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables; a key encapsulation processing unit that generates a key-encapsulated public key and a key-encapsulated secret key based on the encrypted second random tape to transmit the key-encapsulated public key to an other party of key exchange and decrypts a session key using the key-encapsulated public key and a key-encapsulated ciphertext received from the other party of key exchange; and a verification processing unit that generates a signature based on the signature key, a transmission message and the
(Continued)

encrypted third random tape, transmits the signature to the other party of key exchange and verifies a signature received from the other party of key exchange based on a verification key that is a public key of the other party of key exchange, a received message and the signature received.

3 Claims, 13 Drawing Sheets

(52) U.S. Cl.
CPC ........ *H04L 63/0428* (2013.01); *H04L 63/061* (2013.01)

(56) References Cited

OTHER PUBLICATIONS

Chris Peikert, "Lattice Cryptography for the Internet," Jul. 16, 2014, [online]. Version 20140218:221047, pp. 1-25. [retrieved on Jul. 17, 2015]. Retrieved from the Internet: <URL: https://eprint.iacr.org/2014/070/20140218:221047>.
International Search Report of PCT/JP2015/002540, dated Jul. 28, 2015. [PCT/ISA/210].
Written Opinion of PCT/JP2015/002540, dated Jul. 28, 2015. [PCT/ISA/237].

\* cited by examiner

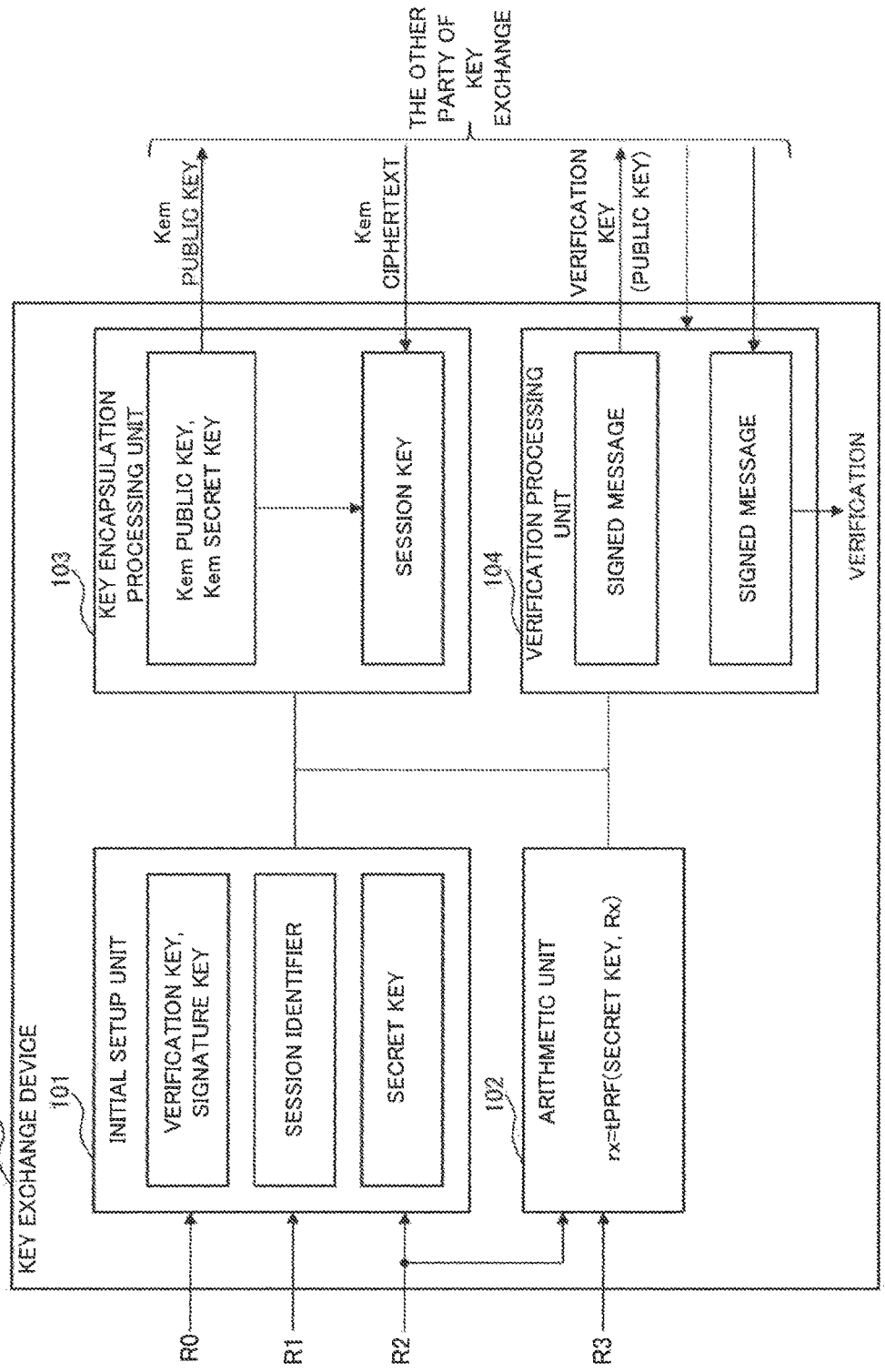

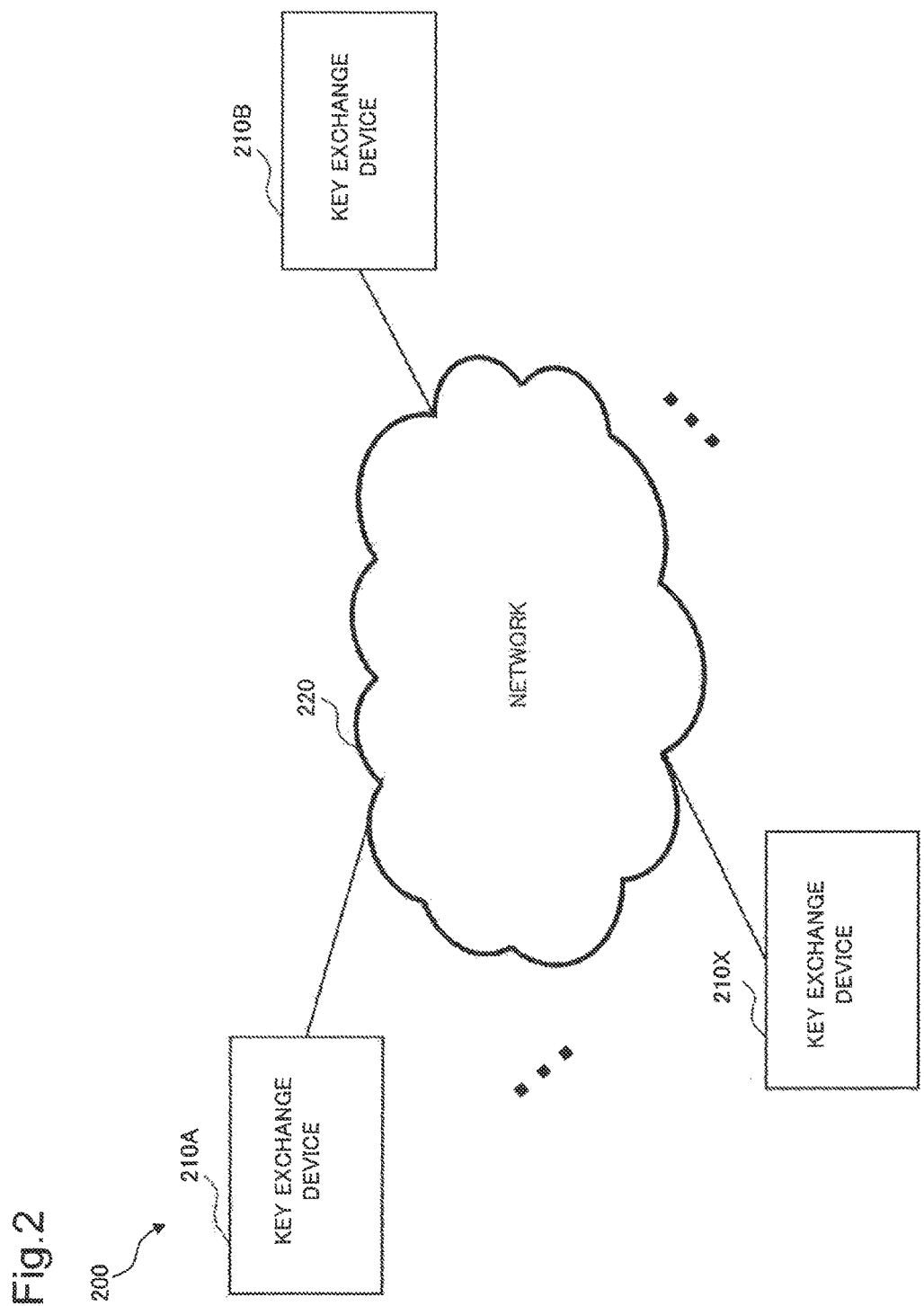

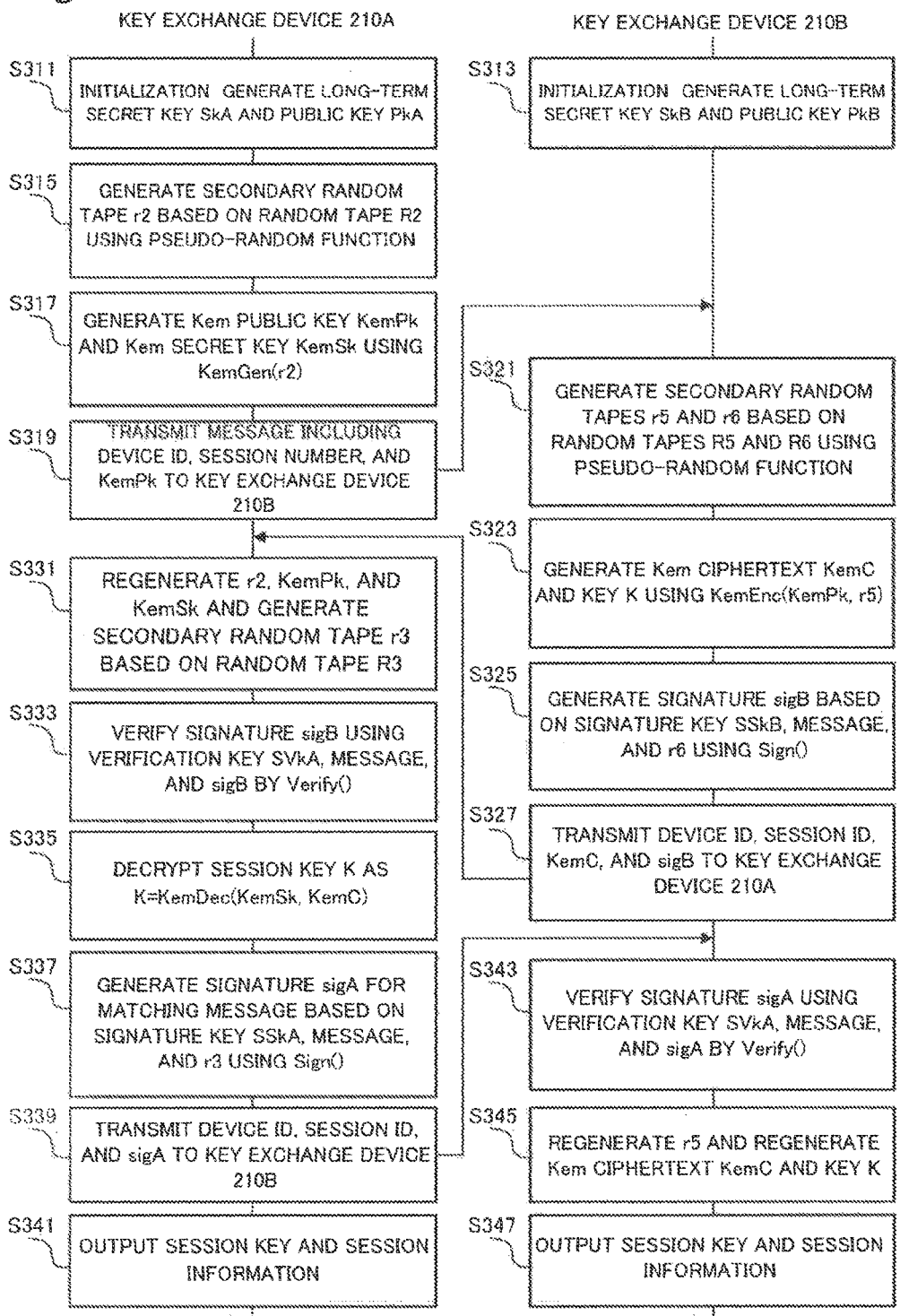

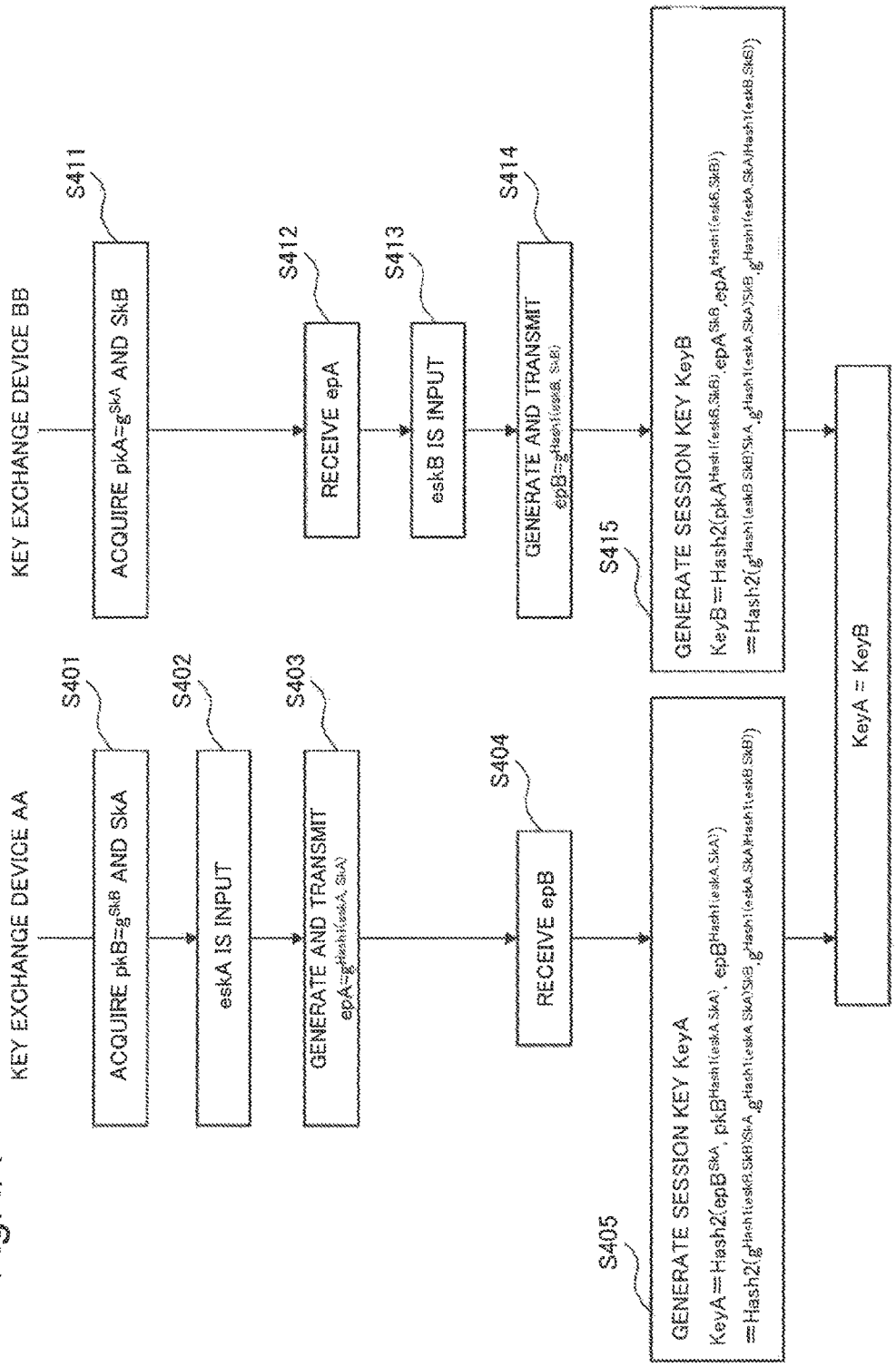

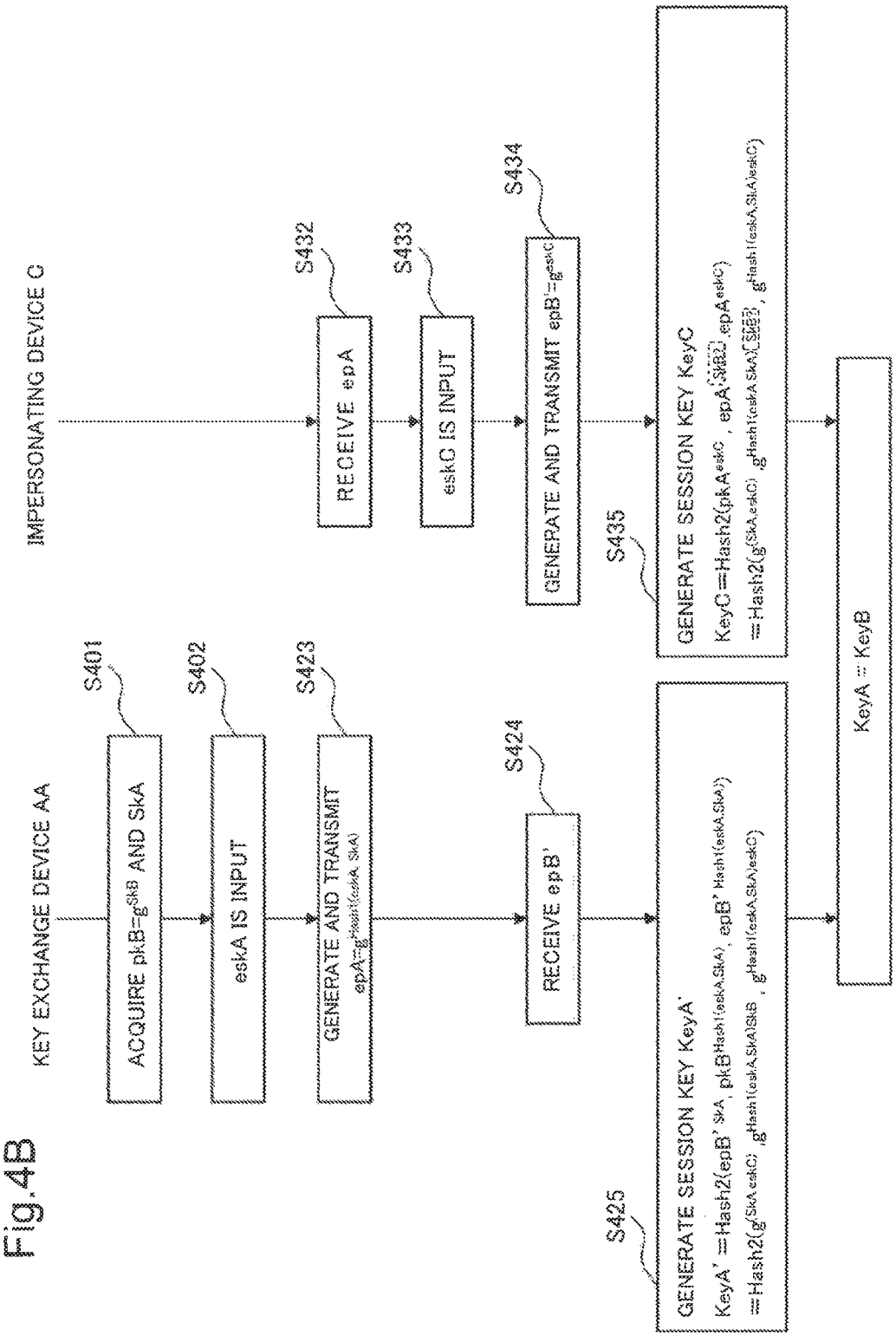

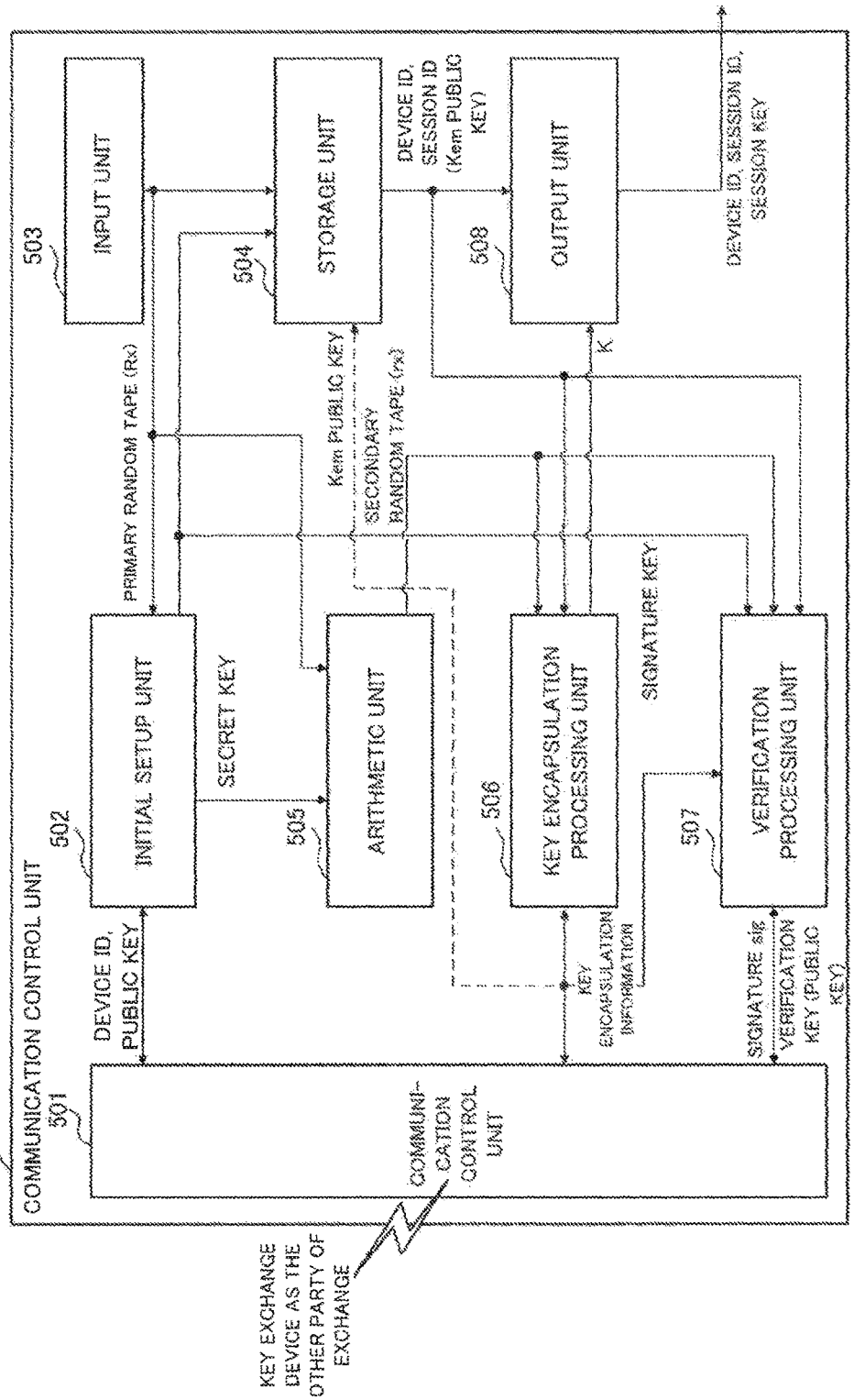

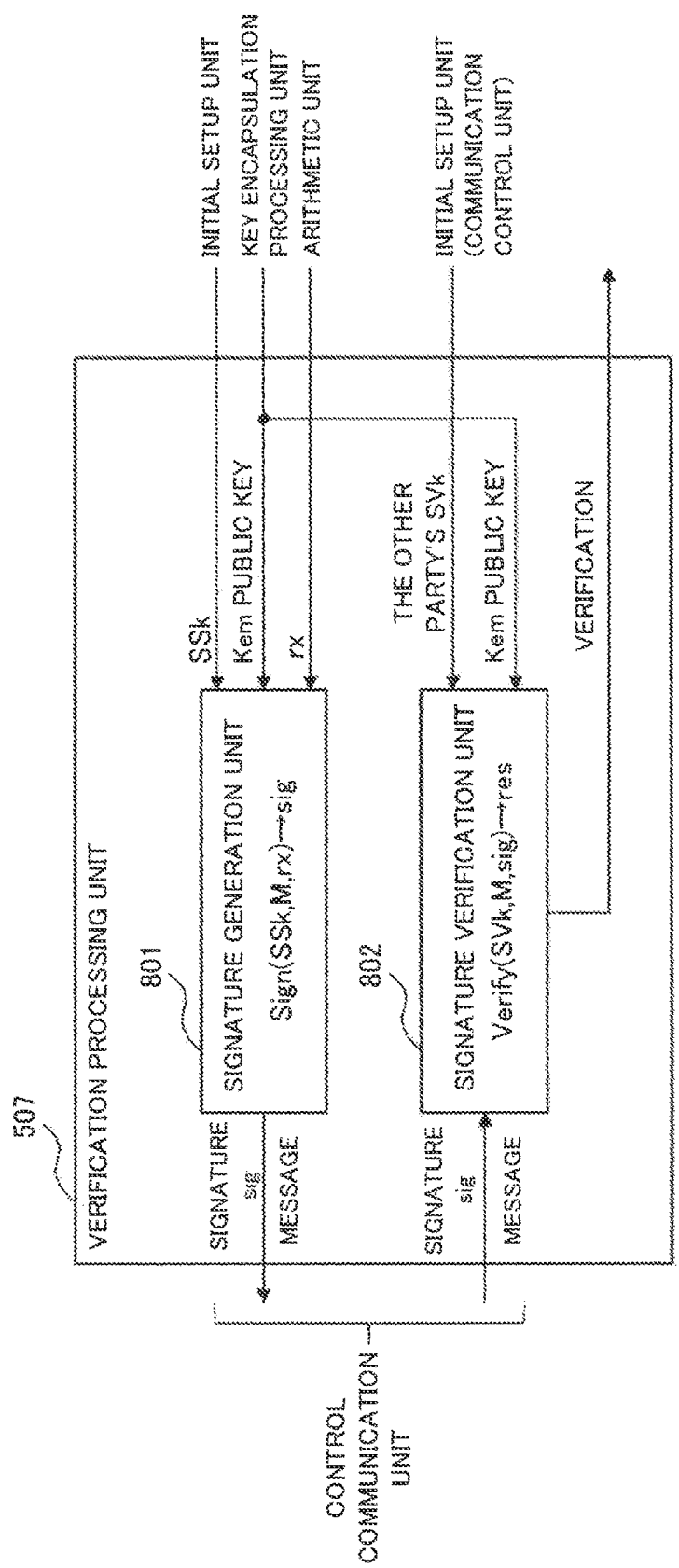

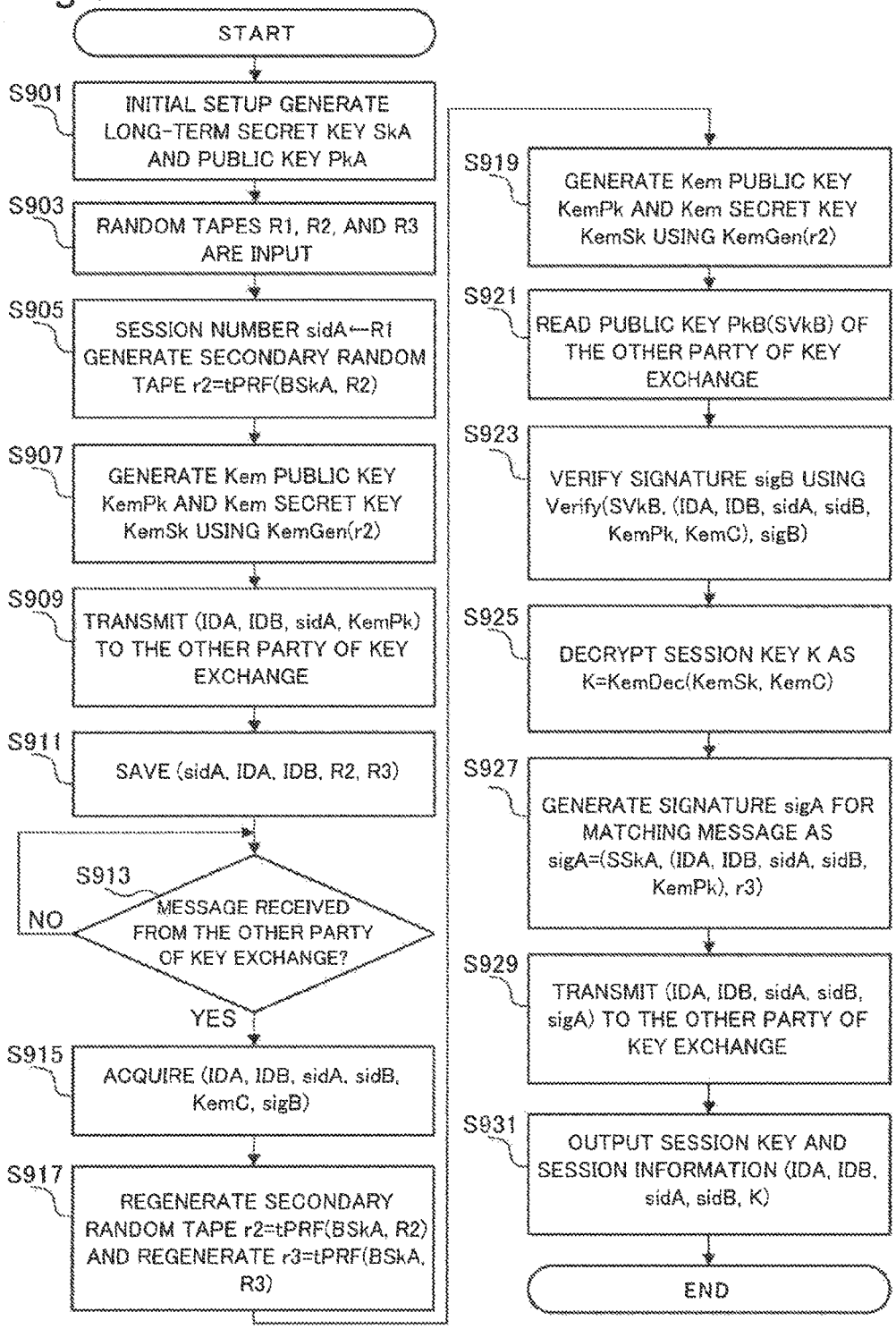

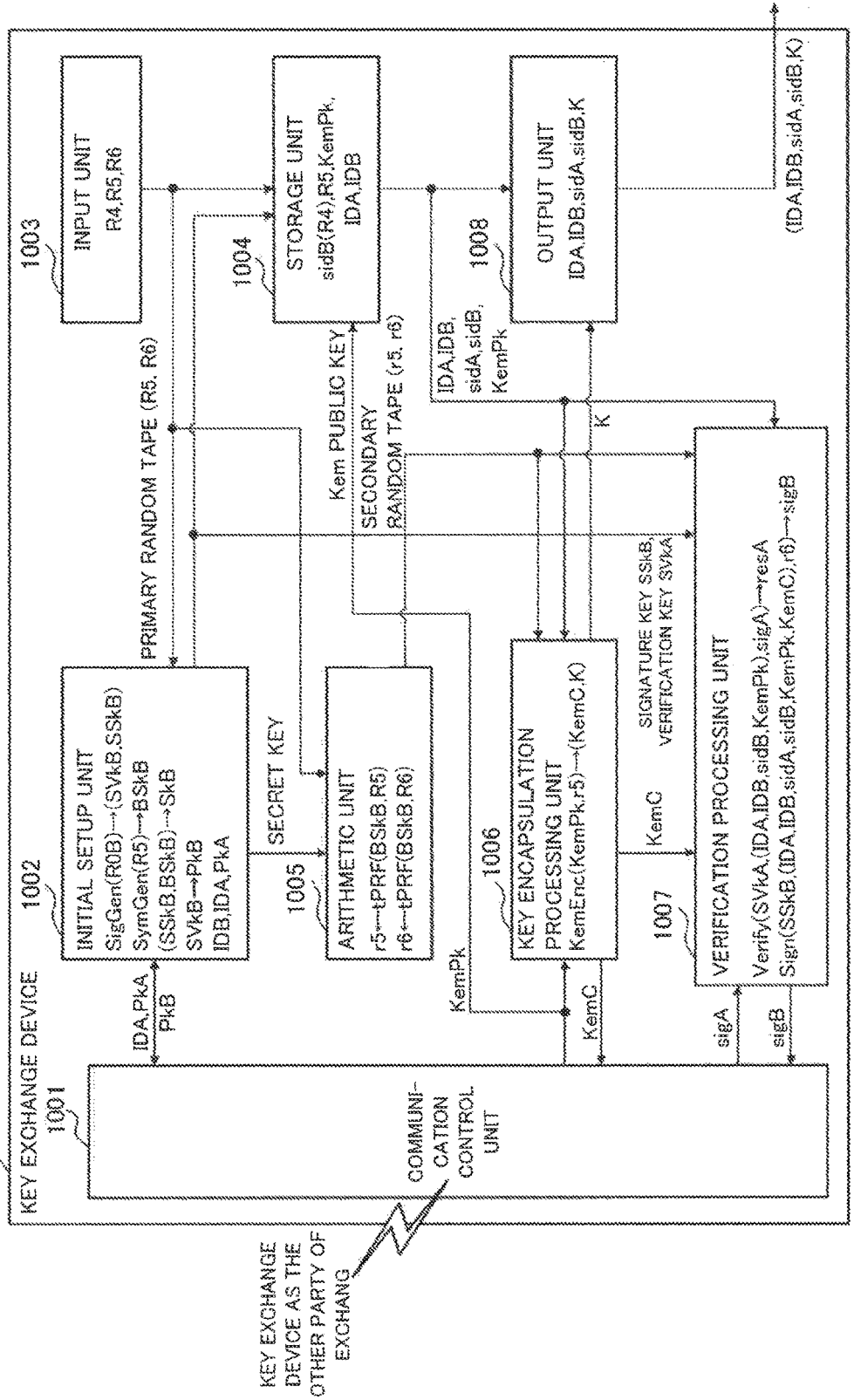

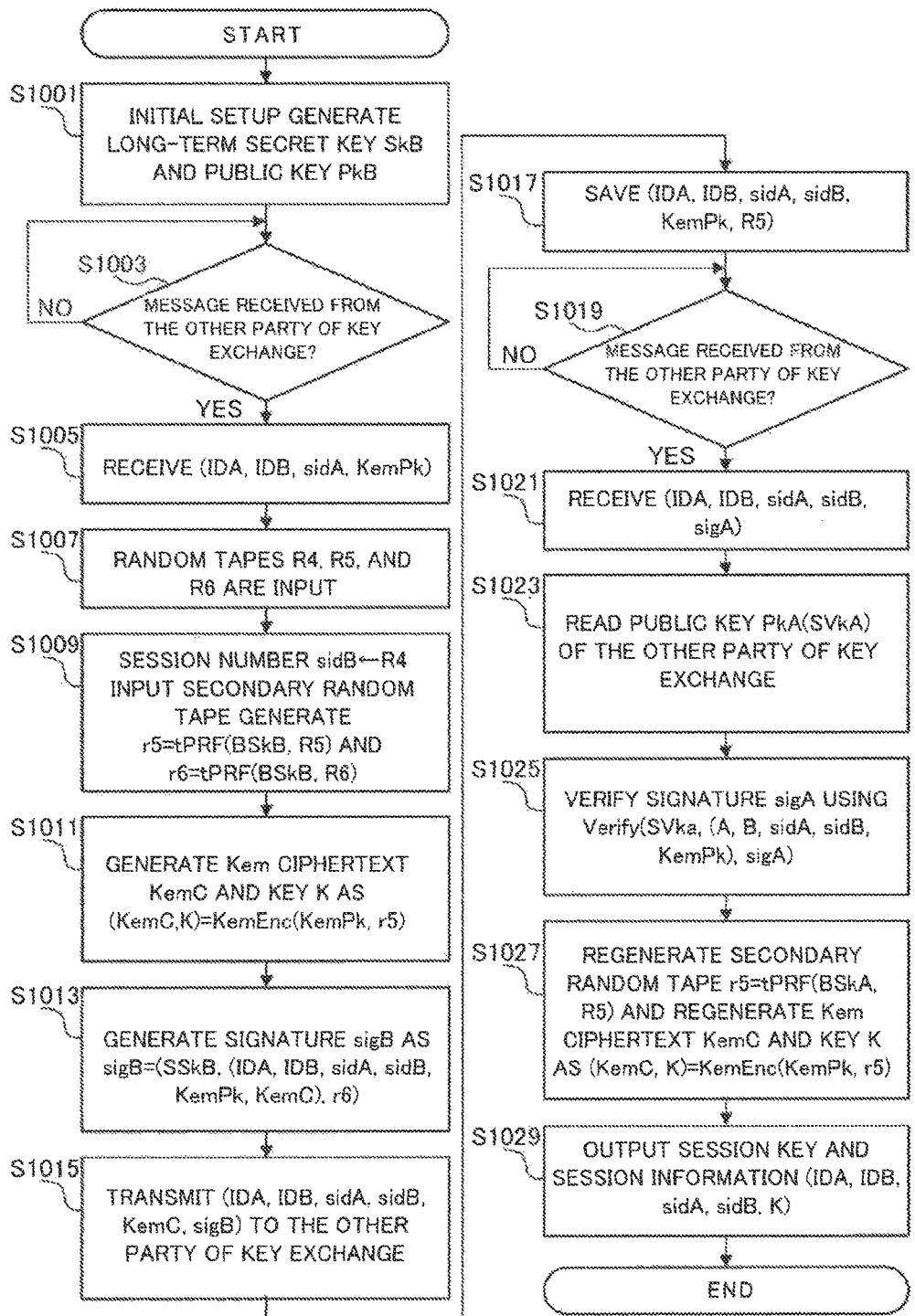

KEY EXCHANGE SYSTEM, KEY EXCHANGE METHOD, KEY EXCHANGE DEVICE, CONTROL METHOD THEREOF, AND RECORDING MEDIUM FOR STORING CONTROL PROGRAM

CROSS REFERENCE TO RELATED APPLICATIONS

This application is a National Stage of International Application No. PCT/JP2015/002540 filed May 20, 2015, claiming priority based on Japanese Patent Application No. 2014-108626 filed May 26, 2014, the contents of all of which are incorporated herein by reference in their entirety.

TECHNICAL FIELD

The present invention relates to a technology of a key exchange device.

BACKGROUND ART

A technology of key exchange is disclosed in NPL 1. Specifically, two key exchange devices, each of which knows a public key of the other, exchange encrypted data into which random tapes input to the respective key exchange devices are encrypted with a long-term secret key of their own. Each key exchange device generates a session key based on the encrypted data received from the other party of exchange, the public key of the other party of exchange, and the long-term secret key of its own. As a result, the session keys that are generated by the two key exchange devices become identical. Unless the random tapes used for generation of the session keys and the long-term secret keys are stolen by an attacker, the session keys are concealed from the attacker.

CITATION LIST

Non Patent Literature

[NPL 1] Brian A. LaMacchia, Kristin Lauter, Anton Mityagin, "Stronger Security of Authenticated Key Exchange" Provable Security, Lecture Notes in Computer Science Volume 4784, 2007, pp 1-16

SUMMARY OF INVENTION

Technical Problem

However, the technology disclosed in the above-described literature has problems in that, when an attacker impersonates one of the key exchange devices and intercepts the encrypted data from the other party of key exchange, the long-term secret key of the impersonated key exchange device is stolen and, further, the session key of the other party of key exchange is stolen by the attacker.

An object of the present invention is to provide a technology that solves the above-described problem.

Solution to Problem

One aspect of a key exchange device according to the present invention, including:
an initial setup unit that generates a verification key that serves as a public key and a signature key based on a discretionary random tape, a session identifier based on a first random tape, and a secret key based on a second random tape;
an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;
a key encapsulation processing unit that generates a key-encapsulated public key and a key-encapsulated secret key based on the encrypted second random tape to transmit the key-encapsulated public key to an other party of key exchange, and decrypts a session key using the key-encapsulated public key and a key-encapsulated ciphertext received from the other party of key exchange; and
a verification processing unit that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received.

Another aspect of a key exchange device according to the present invention, including:
an initial setup unit that generates a verification key that serves as a public key and a signature key based on a discretionary random tape, a session identifier based on a first random tape, and a secret key based on a second random tape;
an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;
a key encapsulation processing unit that encrypts a key-encapsulated public key received from an other party of key exchange and the encrypted second random tape to generate a key-encapsulated ciphertext and a session key and transmits the generated key-encapsulated ciphertext to the other party of key exchange; and
a verification processing unit that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received.

Still another aspect of a key exchange device according to the present invention, including:
an initial setup unit that generates a verification key that serves as a public key and a signature key based on a discretionary random tape, a session identifier based on a first random tape, and a secret key based on a second random tape;
an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;
a key encapsulation processing unit that generates a key-encapsulated public key and a key-encapsulated secret key based on the encrypted second random tape to transmit the key-encapsulated public key to an other party of key exchange, decrypts a session key using the key-encapsulated public key and a key-encapsulated ciphertext received from the other party of key exchange, encrypts a key-encapsulated public key received from the other party of key exchange and the encrypted second random tape to generate a key-encapsulated ciphertext and a session key, and transmits the generated key-encapsulated ciphertext to the other party of key exchange; and a verification processing unit that generates a signature based on the signature key, a transmission message and the encrypted third random tape, transmits the signature to the other party of key exchange and, verifies a signature received from the other party of key exchange based on a verification key that is a public key of the other party of key exchange, a received message and the signature received.

One aspect of a control method of a key exchange device according to the present invention, including:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

generating a key-encapsulated public key and a key-encapsulated secret key based on the encrypted second random tape to transmit the key-encapsulated public key to an other party of key exchange and decrypting a session key using the key-encapsulated public key and a key-encapsulated ciphertext received from the other party of key exchange; and generating a signature based on the signature key, a transmission message, and the encrypted third random tape, transmitting the signature to the other party of key exchange and verifying the signature received from the other party of key exchange based on a verification key that is a public key of the other party of key exchange, a received message and a received signature.

One aspect of a recording medium storing a control program of a key exchange device according to the present invention, the control program making a computer execute:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

generating a key-encapsulated public key and a key-encapsulated secret key based on the encrypted second random tape to transmit the key-encapsulated public key to an other party of key exchange and decrypting a session key using the key-encapsulated public key and a key-encapsulated ciphertext received from the other party of key exchange; and generating a signature based on the signature key, a transmission message and the encrypted third random tape, transmitting the signature to the other party of key exchange and verifying a signature received from the other party of key exchange based on a verification key that is a public key of the other party of key exchange, a received message and the signature received.

Another aspect of a control method of a key exchange device according to the present invention, the method including:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

encrypting a key-encapsulated public key received from an other party of key exchange and the encrypted second random tape to generate a key-encapsulated ciphertext and a session key and transmitting the generated key-encapsulated ciphertext to the other party of key exchange; and generating the signature based on the signature key, a transmission message and the encrypted third random tape, transmitting the signature to the other party of key exchange and verifying a signature received from the other party of key exchange based on a verification key that is a public key of the other party of key exchange, a received message and the received signature.

Another aspect of a recording medium storing a control program of a key exchange device according to the present invention, the control program making a computer execute:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

encrypting a key-encapsulated public key received from an other party of key exchange and the encrypted second random tape to generate a key-encapsulated ciphertext and a session key and transmitting the generated key-encapsulated ciphertext to the other party of key exchange; and generating a signature based on the signature key, a transmission message and the encrypted third random tape, transmitting the signature to the other party of key exchange and verifying a signature received from the other party of key exchange based on a verification key that is a public key of the other party of key exchange, a received message and the signature received.

One aspect of a key exchange system according to the present invention, the key exchange system including:

a first key exchange device that requests key exchange; and a second key exchange device that responds to the request for key exchange, wherein the first key exchange device includes:

a first initial setup unit that generates a verification key that serves as a public key and a signature key based on a discretionary random tape, a session identifier based on a first random tape, and a secret key based on a second random tape;

a first arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;

a first key encapsulation processing unit that generates a key-encapsulated public key and a key-encapsulated secret key based on the encrypted second random tape to transmit the key-encapsulated public key to the second key exchange device and decrypts a session key using the key-encapsulated public key and a key-encapsulated ciphertext received from the second key exchange device; and a first verification processing unit that generates a signature based on the signature key, a transmission message and the encrypted third random tape, transmits the signature to the second key exchange device and verifies a signature received from the other party of key exchange based on a verification key that is a public key of the second key exchange device, a received message and the signature received, and the second key exchange device includes:

a second initial setup unit that generates a verification key that serves as a public key and a signature key based on a discretionary random tape, a session identifier based on a fourth random tape, and a secret key based on a fifth random tape;

an arithmetic unit that generates an encrypted fifth random tape by an arithmetic operation of a pseudo-random function having the fifth random tape and the secret key as variables and an encrypted sixth random tape by an arithmetic operation of the pseudo-random function having a sixth random tape and the secret key as variables;

a second key encapsulation processing unit that encrypts a key-encapsulated public key received from an other party of key exchange and the encrypted fifth random tape to generate a key-encapsulated ciphertext and a session key and transmits the generated key-encapsulated ciphertext to the first key exchange device; and a second verification processing unit that generates a signature based on the signature key, a transmission message and the encrypted sixth random tape, transmits the signature to the first key exchange device and verifies a signature received from the first key exchange device based on a verification key that is a public key of the first key exchange device, a received message and the signature received.

One aspect of a key exchange method according to the present invention, the key exchange method of a key exchange system that includes a first key exchange device that requests key exchange and a second key exchange device that responds to the request for key exchange, the method including:

by the first key exchange device, generating a verification key that serves as a public key and a signature key based on a discretionary random tape, a session identifier based on a first random tape, and a secret key based on a second random tape;

by the first key exchange device, generating an encrypted second random tape by an arithmetic operation of a pseudo-random function having the second random tape and the secret key as variables and an encrypted third random tape by an arithmetic operation of the pseudo-random function having a third random tape and the secret key as variables;

by the first key exchange device, generating a key-encapsulated public key and a key-encapsulated secret key based on the encrypted second random tape and transmitting the key-encapsulated public key to the second key exchange device;

by the second key exchange device, when receiving a key-encapsulated public key from the second key exchange device, generating a verification key that serves as a public key and a signature key based on a discretionary random tape, a session identifier based on a fourth random tape, and a secret key based on a fifth random tape;

by the second key exchange device, generating an encrypted fifth random tape by an arithmetic operation of a pseudo-random function having the fifth random tape and the secret key as variables and an encrypted sixth random tape by an arithmetic operation of the pseudo-random function having a sixth random tape and the secret key as variables;

by the second key exchange device, encrypting a key-encapsulated public key received from the first key exchange device and the encrypted fifth random tape to generate a key-encapsulated ciphertext and a session key and transmitting the generated key-encapsulated ciphertext to the first key exchange device;

by the second key exchange device, generating a signature based on the signature key, a transmission message and the encrypted sixth random tape, transmitting the signature to the first key exchange device;

by the first key exchange device, decrypting a session key using the key-encapsulated public key and a key-encapsulated ciphertext received from the second key exchange device;

by the first key exchange device, generating a signature based on the signature key, a transmission message and the encrypted third random tape, transmitting the signature to the second key exchange device and verifying a signature received from the second key exchange device based on a verification key that is a public key of the second key exchange device, a received message and the signature received; and by the second key exchange device, verifying a signature received from the first key exchange device based on a verification key that is a public key of the first key exchange device, a received message and the signature received.

Advantageous Effects of Invention

The present invention enables a session key to be concealed even when an attacker impersonates the other party of key exchange.

BRIEF DESCRIPTION OF DRAWINGS

FIG. 1 is a block diagram illustrating a configuration of a key exchange device according to a first exemplary embodiment;

FIG. 2 is a block diagram illustrating a configuration of a key exchange system including key exchange devices according to a second exemplary embodiment;

FIG. 3 is a sequence diagram illustrating an outline of an operation procedure of key exchange between key exchange devices according to the second exemplary embodiment;

FIG. 4A is a diagram illustrating an outline of an operation procedure of a key exchange system according to a related art;

FIG. 4B is a diagram illustrating an outline of an operation procedure of key theft through impersonation in the key exchange system according to the related art;

FIG. 5 is a block diagram illustrating a configuration of the key exchange devices according to the second exemplary embodiment;

FIG. 8 is a block diagram illustrating a configuration of a verification processing unit according to the second exemplary embodiment;

FIG. 9B is a flowchart illustrating a processing procedure of the key exchange device as a key exchange request device according to the second exemplary embodiment;

FIG. 10A is a block diagram illustrating a configuration of a key exchange device as a key exchange response device according to the second exemplary embodiment; and FIG. 10B is a flowchart illustrating a processing procedure of the key exchange device as a key exchange response device according to the second exemplary embodiment.

DESCRIPTION OF EMBODIMENTS

Figure 6:
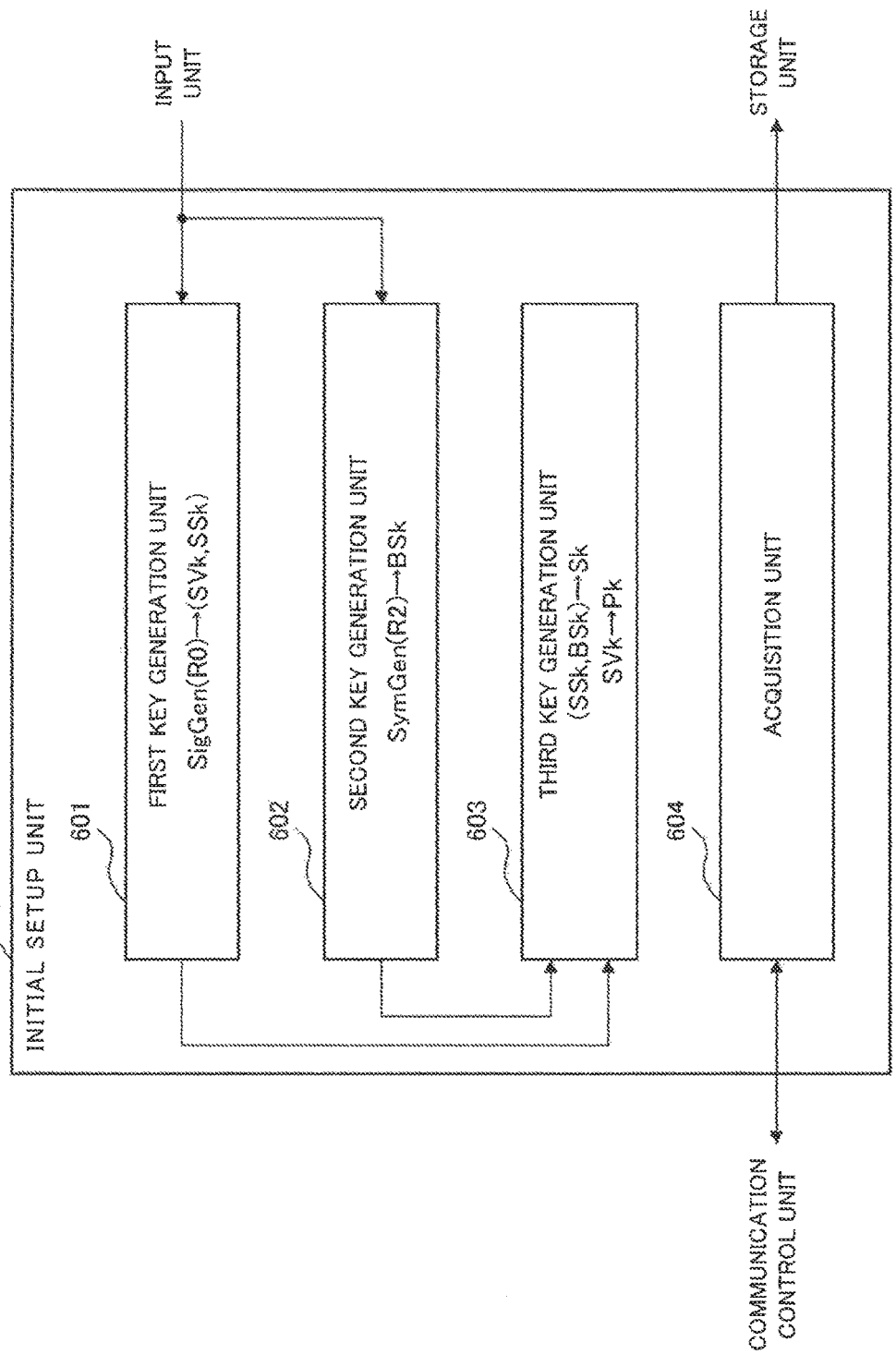
FIG. 6 is a block diagram illustrating a configuration of an initial setup unit according to the second exemplary embodiment.

Hereinafter, exemplary embodiments of the present invention will be described in detail in an exemplifying manner with reference to the accompanying drawings. However, components described in the following exemplary embodiments are only exemplification, and it is not intended that the technical scope of the present invention is limited to only such components.

First Exemplary Embodiment

A key exchange device 100 as a first exemplary embodiment of the present invention will be described using FIG. 1.

As illustrated in FIG. 1, the key exchange device 100 includes an initial setup unit 101, an arithmetic unit 102, a key encapsulation processing unit 103, and a verification processing unit 104.

The initial setup unit 101 generates a verification key which serves as a public key and a signature key based on a discretionary random tape R0, a session identifier based on a first random tape R1, and a secret key based on a second random tape R2. The random tapes are data made up of random numbers and may be files in a secondary storage device.

The arithmetic unit 102 generates an encrypted second random tape r2 by an arithmetic operation of a pseudo-random function tPRF( ) having the second random tape R2 and the secret key as variables. Furthermore, the arithmetic unit 102 generates an encrypted third random tape r3 by an arithmetic operation of a pseudo-random function tPRF( ) having a third random tape R3 and the secret key as variables.

The key encapsulation processing unit 103 generates a Kem public key which is a key-encapsulated public key and a Kem secret key which is a key-encapsulated secret key based on the encrypted second random tape r2 encrypted in the arithmetic unit 102, and transmits the Kem public key to the other party of key exchange. Furthermore, the key encapsulation processing unit 103 receives a Kem ciphertext which is a key-encapsulated ciphertext from a device that is the other party of key exchange. Subsequently, the key encapsulation processing unit 103 decrypts a session key using the Kem public key and the received Kem ciphertext.

The verification processing unit 104, based on the signature key which is generated by the initial setup unit 101, a transmission message, and the encrypted third random tape r3, generates and transmits a signature to the other party of key exchange. The verification processing unit 104, based on a verification key which is a public key of the other party of key exchange, a received message, and a received signature, verifies the signature received from the other party of key exchange.

The present exemplary embodiment enables a session key to be concealed from an attacker even when the attacker impersonates one of key exchange devices and intercepts encrypted data transmitted from the other party of key exchange and a long-term secret key of the impersonated device is stolen.

Second Exemplary Embodiment

Next, a key exchange system including key exchange devices according to a second exemplary embodiment of the present invention will be described using FIGS. 2, 3, 5 to 8, 9A, 9B, 10A and 10B.

The key exchange system including key exchange devices according to the present exemplary embodiment includes a key exchange device 210A that requests key exchange and a key exchange device 210B that responds to the request for key exchange.

The key exchange system operates in the following manner.

The key exchange device 210A generates an encrypted random tape by an arithmetic operation of a pseudo-random function having a random tape and a secret key as variables. The key exchange device 210A generates a key-encapsulated public key and a key-encapsulated secret key based on the encrypted random tape and transmits the key-encapsulated public key to a key exchange device 210B.

When receiving the key-encapsulated public key from the key exchange device 210A, the key exchange device 210B generates an encrypted random tape by an arithmetic operation of a pseudo-random function having a random tape and a secret key as variables in a similar manner. The key exchange device 210B encrypts the key-encapsulated public key received from the key exchange device 210A, and the encrypted random tape to generate a key-encapsulated ciphertext and a session key.

Next, the key exchange device 210B transmits the generated key-encapsulated ciphertext to the key exchange device 210A, generates a signature based on a signature key, a transmission message and an encrypted random tape and transmits the signature generated to the key exchange device 210A.

The key exchange device 210A decrypts the session key using the key-encapsulated public key and the key-encapsulated ciphertext received from the key exchange device 210B, generates a signature based on a signature key, a transmission message and an encrypted random tape, and transmits the signature generated to the key exchange device 210B. The key exchange device 210A, based on a verification key that is a public key of the key exchange device 210B, a received message and a received signature, verifies the signature received from the key exchange device 210B.

On the other hand, the key exchange device 210B verifies the signature received from the key exchange device 210A based on a verification key that is a public key of the key exchange device 210A, a received message and a received signature.

<<Key Exchange System>>

FIG. 2 is a block diagram illustrating a configuration of a key exchange system 200 including key exchange devices according to the present exemplary embodiment.

In the key exchange system 200 in FIG. 2, the key exchange device 210A, the key exchange device 210B and a key exchange device 210X are interconnected by way of a network 220. When each pair of key exchange devices among the key exchange devices 210A to 210X attempts to establish a session, one operates as a key exchange request device that requests key exchange, and the other operates as a key exchange response device. The roles as a key exchange request device and a key exchange response device can be interchangeable.

Although three key exchange devices are illustrated in FIG. 2, there is no limit to the number of key exchange devices. The interconnection may be made by way of, instead of a single network, a multi-tier network including LANs (Local Area Network), a WAN (Wide Area Network), and the like. Hereinafter, in the present exemplary embodiment, an example in which the key exchange device 210A and the key exchange device 210B operate, respectively, as a key exchange request device that requests key exchange and a key exchange response device that responds to the request for key exchange will be described.

<<Related Art>>

Before a description of a key exchange method of the present exemplary embodiment is made, an outline of a key exchange method disclosed in NPL 1 will be described as a related art.

(Operation Outline)

FIG. 4A is a diagram illustrating an outline of an operation procedure of a key exchange system according to the related art.

In the related art, two key exchange devices, a key exchange device AA and a key exchange device BB, communicating with each other causes a secret session key to be established between the two key exchange devices. In the following description, it is assumed that $\lambda$, q, G, g, Hash1, and Hash2 denote, respectively, a constant, a prime, a cyclic group of prime order q, the generator of G, a hash function mapping a bit string of a discretionary length to Zq and a hash function mapping a bit string of a discretionary length to a bit string of a length $\lambda$. The key exchange devices AA and BB have long-term secret keys Sk which are elements of Zq. It is assumed that a long-term secret key of the key exchange device AA is denoted by SkA and a long-term secret key of the key exchange device BB is denoted by SkB. It is assumed that a public key, corresponding to a secret key, of a key exchange device having a secret key Sk is defined as $g^{Sk}$. That is, public keys Pk of the key exchange devices AA and BB are expressed by $PkA=g^{SkA}$ and $PkB=g^{SkB}$, respectively.

Hereinafter, an operation in which the key exchange devices AA and BB in the key exchange system establish a session key will be described.

First, the key exchange device AA in the key exchange system acquires a long-term secret key SkA of the own device and a public key $PkB=g^{SkB}$ of the key exchange device BB (S401).

Next, a random tape eskA which is a bit string of a length $\lambda$ is input to the key exchange device AA, (S402).

The key exchange device AA generates encrypted data $epA=g^{Hash1(eskA, SkA)}$ by encrypting the input random tape eskA with the long-term secret key SkA and transmits the encrypted data epA to the key exchange device BB (S403). Furthermore, the key exchange device AA receives an encrypted data epB that the key exchange device BB has transmitted (S404).

The key exchange device AA generates a session key KeyA as $KeyA=Hash2(epB^{SkA}, PkB^{Hash1(eskA, SkA)}, epB^{Hash1(eskA, SkA)})$ based on the received encrypted data epB, the public key PkB of the key exchange device BB, and the long-term secret key SkA of the own device (S405).

Next, an operation of the key exchange device BB in the key exchange system will be described using FIG. 4A.

The key exchange device BB acquires a long-term secret key SkB of the own device and a public key $PkA=g^{SkA}$ of the key exchange device AA (S411).

The key exchange device BB receives the encrypted data epA that the key exchange device AA has transmitted (S412). Next, to the key exchange device BB, a random tape eskB, which is a bit string of a length $\lambda$ is input (S413).

The key exchange device BB generates an encrypted data $epB=g^{Hash1(eskB, SkB)}$ by encrypting the input random tape eskB with the long-term secret key SkB and transmits the encrypted data epB to the key exchange device AA (S414).

The key exchange device BB generates a session key KeyB as $KeyB=Hash2(PkA^{Hash1(eskB, SkB)}, epA^{SkB}, epA^{Hash1(eskB, SkB)})$ based on the received encrypted data epA, the public key PkA of the key exchange device AA, and the long-term secret key SkB of the own device (S415).

In this way, the key exchange device AA and the key exchange device BB come to have session keys both of which are expressed as $KeyA=KeyB=Hash2(g^{Hash1(eskB, SkB) SkA}, g^{Hash1(eskA, SkA) SkB}, g^{Hash1(eskA, SkA) Hash1(eskB, SkB)})$, coinciding with each other means a success in generating a common session key.

Important characteristics of key exchange include future safety. Future safety means that with regard to a key that two key exchange devices have established at a certain point of time, even if the key exchange devices are attacked sometime in the future and long-term keys of the key exchange devices are stolen by an attacker, the attacker is unable to know the key that was established at a point of time in the past.

The key exchange method of the above-described related art provides not only the future safety but also capability of concealing a session key within a certain range even if random tapes input to respective key exchange devices are leaked. Specifically, when a key exchange device AA and a key exchange device BB have established a session key, the session key KeyA=KeyB is concealed from an attacker unless an event occurs that both a random tape eskA and a long-term key SkA are stolen from the key exchange device AA by the attacker. Alternatively, the session key KeyA=KeyB is concealed from an attacker unless an event occurs that both a random tape eskB and a long-term key SkB are stolen from the key exchange device BB by the attacker.

When attention is now given to the key exchange device AA, since both the random tape eskA and the long-term key SkA are the entire information for the key exchange device AA to generate a session key, it becomes difficult to conceal the session key when the information is stolen. However, as long as the random tape eskA is not leaked, the session key is concealed even if the long-term key SkA is leaked after a session has been established, which ensures future safety. In the method of the related art, to ensure a stronger safety, the session key is concealed even if the long-term key SkA is leaked before a session is established.

(Key Theft through Impersonation)

FIG. 4B is a diagram illustrating an outline of an operation procedure of key theft through impersonation in the key exchange system according to the related art. In FIG. 4B, the same step numbers are assigned to the same steps as those in FIG. 4A.

When, for example, the key exchange device AA communicates with an impersonating device C (attacker) that impersonates the key exchange device BB and establishes a session key, the key exchange method of the above-described related art is incapable of providing sufficient future safety. In the key exchange method of the related art, a condition for a session key, which the key exchange device AA believes having established, to be concealed from an attacker is that the long-term key SkB of the key exchange device BB is not stolen by the attacker regardless of time. In actuality, however, an attacker who is able to steal the long-term key SkB in the future is able to know, through an attack as described below, a session key that the key exchange device AA establishes with the key exchange device BB.

When the key exchange device AA attempts to start a session with the key exchange device BB, an attacker is able to establish a session key impersonating as an impersonating device C impersonating the key exchange device BB as described below.

Hereinafter, an operation of key theft in a key exchange system made up of the impersonating device C and the key exchange device AA will be described using FIG. 4B. A detailed description of a prerequisite for key exchange that is the same as in FIG. 4A will be omitted. Since operations of the key exchange device AA in steps S401 to S402 are the same as in FIG. 4A, a detailed description thereof will be omitted.

The key exchange device AA generates encrypted data $epA = g^{Hash1(eskA, SkA)}$ by encrypting the input random tape eskA with the long-term secret key SkA and transmits the encrypted data epA to the impersonating device C (S423). Furthermore, the key exchange device AA receives an encrypted data epB', which the impersonating device C has transmitted (S424).

The key exchange device AA generates a session key KeyA' as KeyA' = Hash2(epB'SkA, $PkB^{Hash1(eskA, SkA)}$, $epB'^{Hash1(eskA, SkA)}$) based on the received encrypted data epB', the public key PkB of the key exchange device BB, and the long-term secret key SkA of the own device (S425).

The impersonating device C receives the encrypted data epA that the key exchange device AA has transmitted (S432). Next, the impersonating device C chooses an element eskC of Zq at random as a random tape, which is a bit string of a length λ (S433). The impersonating device C generates and transmits impersonation information $epB' = g^{eskC}$ of the key exchange device BB to the key exchange device AA (S434). The impersonating device C generates a session key KeyC as KeyC = Hash2($PkA^{eskC}$, $epA^{SkB?}$, $epA^{eskC}$) (S435).

Since the secret key skB (denoted by skB? in FIG. 4B) of the key exchange device BB is not known, an attacker (impersonating device C) is unable to know KeyA' at this point of time. However, the attacker is able to receive a large amount of ciphertext that the key exchange device AA has encrypted with the key KeyA'. Further, the attacker is able to increase the probability of acquiring the secret key SkB of the key exchange device BB through subsequent persistent attacks. In consequence, by acquiring the secret key SkB, the attacker is able to generate a session key as KeyA' = KeyC = Hash2($PkA^{eskC}$, $epA^{SkB}$, $epA^{eskC}$).

As described above, in the related art, when the key exchange device AA and the key exchange device BB have established a session key, the session key KeyA = KeyB is concealed from an attacker unless both the random tape eskA and the long-term key SkA are stolen from the key exchange device AA by the attacker. Alternatively, the session key KeyA = KeyB is concealed from an attacker unless both the random tape eskB and the long-term key SkB are stolen from the key exchange device BB by the attacker.

On the other hand, when the key exchange device AA communicates with an attacker who impersonates the key exchange device BB to establish a session key, the session key KeyA is to be stolen by the attacker if both the random tape eskA and the long-term key SkA are stolen from the key exchange device AA by the attacker. Alternatively, the session key KeyA is to be stolen by the attacker if the long-term key SkB is stolen from the key exchange device BB by the attacker even before the session is established.

<<Technology of the Exemplary Embodiment>>

Next, a key exchange method performed by the key exchange device of the present exemplary embodiment, which has solved the above-described problem in the related art, will be described in detail.

First, functions and the like used in the key exchange method performed by the key exchange device of the present exemplary embodiment will be defined.

(Block Cipher)

It is assumed that a block cipher is configured using three algorithms SymGen, SymEnc, and SymDec. "SymGen" generates a symmetric key K. "SymEnc" generates a ciphertext block C as C = SymEnc(K, M) using the symmetric key K and a message block M. "SymDec" decrypts the message block M as M = SymDec(K, C) using the symmetric key K and the ciphertext block C.

(Pseudo-Random Function)

A twisted pseudo-random function tPRF is defined as follows. A "function tPRF" is a pseudo-random function to which a bit string of a length λ and a bit string of a length λ are input and that outputs a bit string of a length λ.

The twisted pseudo-random function is assumed to be a function such that both a function that outputs tPRF(S, A) and a function that outputs tPRF(A, S) based on a secret key S and a discretionary value A become pseudo-random functions.

The following function is conceivable as an example of a twisted pseudo-random function.

$$tPRF(X,Y) = SymEnc(X,Y) + SymEnc(Y,X)$$

where a key length, a message block length, and a ciphertext block length of SymEnc are all assumed to be λ. It is assumed that a sign "+" denotes a bitwise exclusive disjunction.

(Key Encapsulation)

It is assumed that key encapsulation is performed using three algorithms KemGen, KemEnc, and KemDec. To "KemGen", a λ-bit random tape R1 is input and "KemGen" outputs a pair (KemPk, KemSk) of a Kem public key and a Kem secret key. That is, (KemPk, KemSk) = KemGen(R1). To "KemEnc", a Kem public key and a λ-bit random tape R2 are input and "KemEnc" outputs a pair (c, K) of a Kem ciphertext and a key. That is, (KemC, K) = KemEnc(KemPk, R2). To "KemDec", a pair (KemSk, KemC) of a Kem secret key and a Kem ciphertext is input and "KemDec" outputs a key K. That is, K = KemDec(KemSk, KemC).

The following example is conceivable as key encapsulation. It is assumed that G is a cyclic group of prime order q and g is the generator thereof. KemGen is assumed to generate an element x of Zq at random and output a pair (KemPk, KemSk) as (KemPk, KemSk)=($g^x$, x). KemEnc is assumed to generate an element y of Zq at random and output a pair (KemC, K) as (KemC, K)=($g^y$, pky). KemDec is assumed to output a key K as K=KemC$^{KemSk}$.

(Signature)

It is assumed that signature is performed using three algorithms SigGen, Sign, and Verify. To "SigGen", a λ-bit random tape R3 is input and "SigGen" outputs a pair (SVk, SSk) of a verification key and a signature key. That is, (SVk, SSk)=SigGen(R3). To "Sign", a signature key SSk, a message M, and a λ-bit random tape R4 are input and "Sign" outputs a signature sig. That is, sig=Sign(SSk, M, R4). To "Verify", a verification key SVk, a message M, and a signature sig are input and "Verify" outputs a signature verification result res. That is, res=Verify(SVk, M, sig).

<<Operation Procedure of Key Exchange System>>

FIG. 3 is a sequence diagram illustrating an outline of an operation procedure of key exchange between the key exchange device 210A and the key exchange device 210B according to the present exemplary embodiment.

The key exchange device 210A performs initial setup by initialization in step S311. For example, the key exchange device 210A generates and saves a long-term secret key SkA and a public key PkA. On the other hand, the key exchange device 210B also generates and saves a long-term secret key SkB and a public key PkB in a similar manner by initialization in step S313.

The key exchange device 210A, using a pseudo-random function, generates an encrypted secondary random tape r2 based on a random tape R2 in step S315. Next, the key exchange device 210A generates a Kem public key KemPk and a Kem secret key KemSk by KemGen(r2) using the secondary random tape r2 in step S317. The key exchange device 210A transmits, as a Kem public key, a message including a device ID, a session ID, and KemPk to the key exchange device 210B, which is the other party of key exchange, in step S319.

When receiving the message from the key exchange device 210A, the key exchange device 210B, using a pseudo-random function, generates encrypted secondary random tapes r5 and r6 based on random tapes R5 and R6 in step S321. The key exchange device 210B generates a Kem ciphertext KemC and a session key K by KemEnc (KemPk, r5) using the secondary random tape r5 in step S323. Next, the key exchange device 210B performs steps S325 and S327 as signature generation/transmission processing. The key exchange device 210B first generates a signature sigB based on a signature key SSkB, a transmission message, and the secondary random tape r6 using Sign( ) in step S325. In the transmission message, for example, a device ID, a session ID, the Kem public key KemPk, and the Kem ciphertext KemC may be included. The key exchange device 210B responds to the key exchange device 210A by transmitting a message including the device ID, the session ID, the Kem ciphertext KemC, and the signature sigB in step S327.

When receiving the response from the key exchange device 210B, the key exchange device 210A regenerates the secondary random tape r2 to regenerate the Kem public key KemPk and the Kem secret key KemSk and, using a pseudo-random function, generates an encrypted secondary random tape r3 based on a random tape R3 in step S331. In this procedure, the secondary random tape r2, the Kem public key KemPk, and the Kem secret key KemSk are regenerated for prevention of leakage thereof. Next, the key exchange device 210A verifies the signature sigB, transmitted from the key exchange device 210B, using Verify (verification key SVkB, received message, sigB) in step S333. The key exchange device 210A decrypts the session key K as K=KemDec(KemSk, KemC) in step S335. Next, the key exchange device 210A generates a signature sigA based on a signature key SSkA, a transmission message, and the secondary random tape r3 using Sign( ) in step S337. In the transmission message, for example, the device ID, the session ID, and the Kem public key KemPk may be included. The key exchange device 210A transmits a message including the device ID, the session ID, and the signature sigA to the key exchange device 210B in step S339. The key exchange device 210A outputs the session key and session information including the device IDs of both key exchange devices and both session IDs in step S341.

When receiving the message from the key exchange device 210A, the key exchange device 210B verifies the signature sigA, transmitted from the key exchange device 210A, using Verify(verification key SVkA, received message, sigA), as signature verification processing, in step S343. Next, the key exchange device 210B regenerates the secondary random tape r5 to regenerate the Kem ciphertext KemC and the session key K in step S345. In this procedure, the secondary random tape r5, the Kem ciphertext KemC, and the session key K are regenerated for prevention of leakage thereof. The key exchange device 210B outputs the session key and session information including the device IDs of both key exchange devices and both session IDs in step S347.

<<Detailed Operation Procedure>>

Next, a detailed operation of key exchange between the key exchange device 210A and the key exchange device 210B according to the present exemplary embodiment will be described.

<Initial Setup of Key Exchange Devices>

Each key exchange device, using a random tape r0 and the algorithm SigGen, generates a pair (SVk, SSk) of a verification key and a signature key as (SVk, SSk)=SigGen(R0). A verification key and a signature key of a key exchange device X are denoted by SVkX and SSkX, respectively. Each key exchange device, using a random tape R2 and the algorithm SymGen, generates a secret key BSk of a block cipher as BSk=SymGen(R2). A secret key of a key exchange device X is denoted by BSkX.

It is assumed that a long-term key and a public key of each key exchange device are defined as SkX=(SSkX, BSkX) and PkX=SVkX, respectively. Specifically, it is assumed that a long-term key and a public key of the key exchange device 210A are defined as SkA=(SSkA, BSkA) and PkA=SVkA, respectively. It is also assumed that a long-term key (305) and a public key (306) of the key exchange device 210B are defined as SkB=(SSkB, BSkB) and PkB=SVkB, respectively. It is assumed that each key exchange device knows a public key of the other (by means of obtaining the identifier of a device at the other end of key exchange, it is possible to read a public key of the device).

<Session Key Establishment Method in Key Exchange between Two Key Exchange Devices 210A and 210B>

First of all, generation and transmission of a Kem public key to the key exchange device 210B by the key exchange device 210A will be described.

First, to the key exchange device 210A (having an identifier IDA), the identifier (identifier IDB) of the key exchange device 210B, which is the other party of key exchange, is input. Next, to the key exchange device 210A, three random tapes, which are bit strings of a length λ, are input. The input random tapes are denoted by R1, R2, and R3 in order. The random tapes that are input to the key exchange device 210A are collectively denoted by eskA=(R1, R2, R3). In this case, R1, R2, and R3 may be independent random tapes that have no relation with one another. Alternatively, R1, R2, and R3 may be generated as random tapes having no relation with one another into which a long tape is divided.

Next, the key exchange device 210A generates a session number sidA=R1 and a random tape r2 as r2=tPRF(BSkA, R2).

Next, the key exchange device 210A generates a pair of a Kem public key (310) and a Kem secret key as (KemPk, KemSk)=KemGen(r2).

Next, the key exchange device 210A transmits (IDA, IDB, sidA, KemPk) to the key exchange device 210B.

The key exchange device 210A saves (sidA, IDA, IDB, R2, R3) as information on a session state.

Subsequently, generation and transmission, by the key exchange device 210B, of a session key and a signed message to the key exchange device 210A will be described.

First, the key exchange device 210B receives (IDA, IDB, sidA, KemPk) from the key exchange device 210A.

Next, three random tapes, which are bit strings of a length X, are input to the key exchange device 210B. The input random tapes are denoted by R4, R5, and R6 in order. The random tapes are collectively denoted by eskB=(R4, R5, R6). In this case, R4, R5, and R6 may be independent random tapes that have no relation with one another. Alternatively, R4, R5, and R6 may be generated as random tapes having no relation with one another into which a long tape is divided.

The key exchange device 210B generates a session number sidB as sidB=R4, a random tape r5 as r5=tPRF(BSkB, R5), and a random tape r6=tPRF(BSkB, R6).

The key exchange device 210B generates a pair of a Kem ciphertext and a key as (KemC, K)=KemEnc(KemPk, r5) and a signature as sigB=Sign(SSkB, (A, B, sidA, sidB, KemPk, KemC), r6).

The key exchange device 210B transmits (IDA, IDB, sidA, sidB, KemC, sigB) to the key exchange device 210A.

The key exchange device 210B saves (IDA, IDB, sidA, sidB, KemPk, R5) as information on a session state.

Subsequently, signature verification, generation of a session key and a signed message, and transmission of the session key and the signed message to the key exchange device 210B by the key exchange device 210A will be described.

The key exchange device 210A receives (IDA, IDB, sidA, sidB, KemC, sigB) from the key exchange device 210B.

The key exchange device 210A reads (sidA, IDA, IDB, R2, R3) that have been saved and the public key PkB of the key exchange device 210B. The key exchange device 210A also regenerates the random tape r2 as r2=tPRF(BSkA, R2) and generates a random tape r3 as r3=tPRF(BSkA, R3). The key exchange device 210A regenerates the pair of the Kem public key and the Kem secret key as (KemPk, KemSk)=KemGen(r2) and calculates Verify(SVkB, (IDA, IDB, sidA, sidB, KemPk, KemC), sigB). Using a result of the calculation, the key exchange device 210A verifies that the signature sigB is a proper signature for (IDA, IDB, sidA, sidB, KemPk, KemC) signed by the key exchange device 210B. The key exchange device 210A generates a key as K=KemDec(KemSk, KemC). The key exchange device 210A generates a signature for (IDA, IDB, sidA, sidB, KemPk), which is a message based on which signature matching is verified, as sigA=Sign(SSkA, (IDA, IDB, sidA, sidB, KemPk), r3).

The key exchange device 210A transmits (IDA, IDB, sidA, sidB, sigA) to the key exchange device 210B.

The key exchange device 210A outputs the session key K and information on the session as (IDA, IDB, sidA, sidB, K).

Subsequently, signature verification and output of a session key and session information by the key exchange device 210B will be described.

The key exchange device 210B receives (IDA, IDB, sidA, sidB, sigA) from the key exchange device 210A.

The key exchange device 210B reads (sidA, IDA, IDB, KemPk, R5) that have been saved and the public key PkA=SVkA of the key exchange device 210A. The key exchange device 210B verifies that the signature sigA is a proper signature for (IDA, IDB, sidA, sidB, KemPk) signed by the key exchange device 210A. Subsequently, the key exchange device 210B regenerates the random tape r5 as r5=tPRF(BSkA, R5) and the pair of the Kem ciphertext and the key as (KemC, K)=KemEnc(KemPk, r5). The key exchange device 210B outputs the session key K and information on the session as (IDA, IDB, sidA, sidB, K).

<<Configuration of Key Exchange Device>>

FIG. 5 is a block diagram illustrating a configuration of the key exchange devices 210A and 210B according to the present exemplary embodiment. The respective components in FIG. 5 are achieved by CPUs (Central Processing Unit) in the key exchange devices 210A and 210B executing programs stored in storages using RAMs (Random Access Memory).

Each of the key exchange devices 210A and 210B includes a communication control unit 501, an initial setup unit 502, an input unit 503, an arithmetic unit 505, and a storage unit 504. Each of the key exchange devices 210A and 210B further includes a key encapsulation processing unit 506, a verification processing unit 507, and an output unit 508.

Each communication control unit 501 controls communication with a key exchange device that is the other party of key exchange by way of the network 220. There is no specific restriction on a communication protocol and the like. Each initial setup unit 502 generates and holds various types of keys, for example, a secret key, a signature key, and a verification key (public key). Each initial setup unit 502 may acquire a device ID and a public key of the other party of key exchange. The input units 503 input random tapes that are used by the key exchange devices 210A and 210B. For example, in the present exemplary embodiment, to the key exchange devices 210A, random tapes R1, R2, and R3 are input and to the key exchange devices 210A and 210B, random tapes R4, R5, and R6 are input. Each arithmetic unit 505, using a pseudo-random function, generates encrypted secondary random tapes rx based on primary random tapes Rx with a secret key acquired from the initial setup unit 502. In the following processing performed by each key encapsulation processing unit 506 and verification processing unit 507, only encrypted secondary random tapes rx are used. Each storage unit 504 saves information for identifying a session that has been established. In the storage units 504, for example, device IDs of both key exchange devices that have established a session, both session IDs, primary random tapes, and the like are saved. In a key exchange device that responds to a key exchange request, a Kem public key KemPk that a key exchange device having issued the request has generated and transmitted is also saved.

Each key encapsulation processing unit 506 generates key-encapsulated or encrypted information and decrypts information by decapsulation. The key encapsulation processing units 506 exchange key-encapsulated information between the devices exchanging keys with each other to share a session key so as to have strong future safety against significant key leakage. The verification processing units 507 generate and transmit signatures for key-encapsulated messages exchanged between the devices exchanging keys with each other and verify signatures included in received messages to further reinforce the secrecy of a session key. Each output unit 508 outputs a session key shared by the devices exchanging keys with each other and a session state that identifies the session.

(Initial Setup Unit)

FIG. 6 is a block diagram illustrating a configuration of the initial setup unit 502 according to the present exemplary embodiment.

The initial setup unit 502 includes a first key generation unit 601, a second key generation unit 602, and a third key generation unit 603. The initial setup unit 502 also includes an acquisition unit 604 as an option.

The first key generation unit 601, based on a random tape R0, generates a verification key SVk and a signature key SSk as (SVk, SSk)=SigGen(R0). The second key generation unit 602, based on a random tape R2, generates a secret key BSk as BSk=SymGen(R2). The third key generation unit 603 sets (SSk, BSk) as a long-term key Sk and SVk as a public key Pk. The acquisition unit 604 acquires a public key of the other party of key exchange by means of the device ID thereof by way of the communication control unit 501.

(Key encapsulation Processing Unit)

Figure 7:
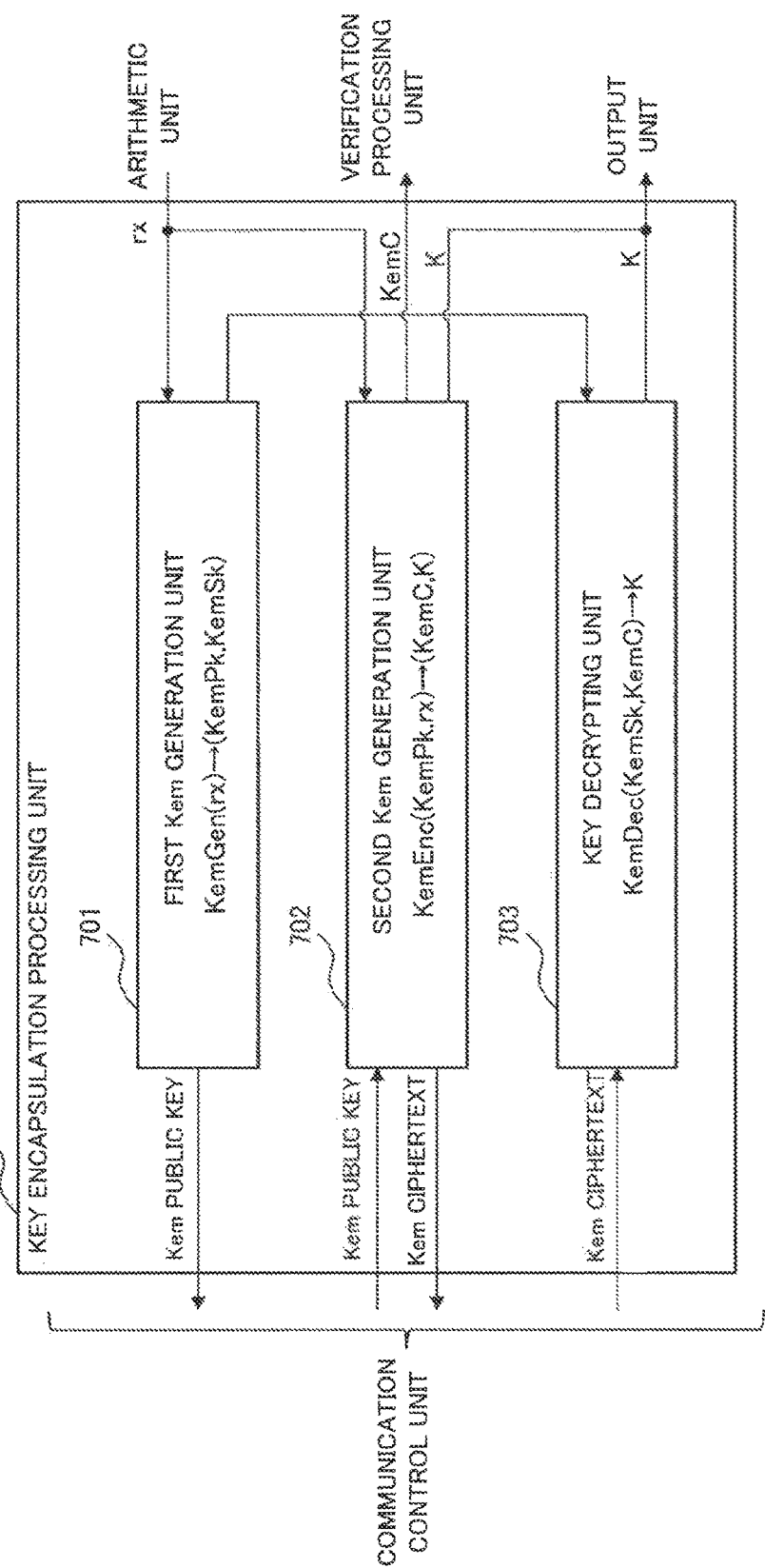
FIG. 7 is a block diagram illustrating a configuration of a key encapsulation processing unit according to the second exemplary embodiment.

FIG. 7 is a block diagram illustrating a configuration of the key encapsulation processing unit 506 according to the present exemplary embodiment.

The key encapsulation processing unit 506 includes a first Kem generation unit 701, a second Kem generation unit 702, and a key decrypting unit 703. A key exchange device requesting key exchange uses the first Kem generation unit 701 and the key decrypting unit 703. A key exchange device responding to the request for key exchange uses the second Kem generation unit 702.

The first Kem generation unit 701, based on an encrypted secondary random tape rx, generates a Kem public key KemPk and a Kem secret key KemSk as (KemPk, KemSk)= KemGen(rx).

The second Kem generation unit 702, based on a Kem public key KemPk and a secondary random tape rx, generates a Kem ciphertext KemC and a key K as (KemC, K)=KemEnc(KemPk, rx). The key decrypting unit 703, based on a Kem secret key KemSk and a Kem ciphertext KemC, decrypts the key k as K=KemDec(KemSk, KemC).

(Verification Processing Unit)

FIG. 8 is a block diagram illustrating a configuration of the verification processing unit 507 according to the present exemplary embodiment.

The verification processing unit 507 includes a signature generation unit 801 and a signature verification unit 802.

The signature generation unit 801, based on a signature key SSk, a transmission message M, and a secondary random tape rx, generates a signature sig as sig=Sign(SSk, M, rx). The signature verification unit 802, based on a verification key SVk, which is also a public key, a transmission message M, and a signature sig, verifies and confirm the signature sig as res=Verify(SVk, M, sig).

<<Configuration of Key Exchange Device 210A>>

Figure 9A:
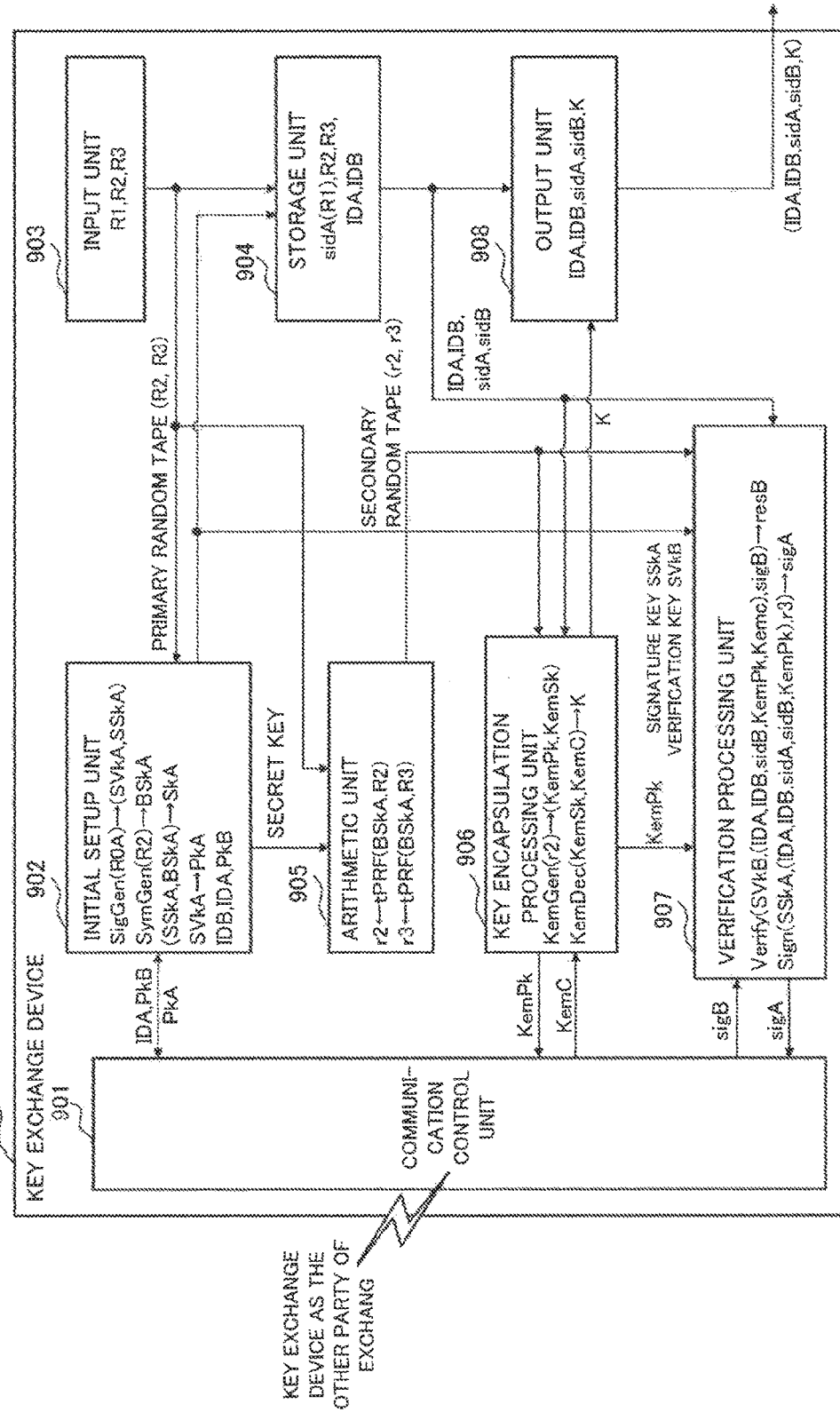
FIG. 9A is a block diagram illustrating a configuration of a key exchange device as a key exchange request device according to the second exemplary embodiment.

FIG. 9A is a block diagram illustrating a configuration of the key exchange device 210A as a key exchange request device according to the present exemplary embodiment. The key exchange device 210A is a key exchange device on the side requesting key exchange. The configuration in FIG. 9A corresponds to the configuration in FIG. 5, and the reference numbers of each component in both drawings are assigned in such a way that the last digits thereof coincide with each other.

The key exchange device 210A includes a communication control unit 901, an initial setup unit 902, an input unit 903, an arithmetic unit 905, and a storage unit 904. The key exchange device 210A further includes a key encapsulation processing unit 906, a verification processing unit 907, and an output unit 908. Since the outlines of the respective components were already described with reference to FIG. 5, a case of a key exchange device on the side requesting key exchange will be described in FIG. 9A.

In the initial setup unit 902, a verification key SVkA and signature key SSkA are generated using SymGen(R0A) and a secret key BSkA is generated using SymGen(R2). In the initial setup unit 902, a pair (SSkA, BSkA) of the signature key and secret key is set as a long-term secret key SkA and the verification key SVkA is set as a public key PkA. Furthermore, device identifiers IDA and IDB and a public key PkB of the other party of key exchange may be acquired. The input unit 903 inputs primary random tapes R1, R2, and R3.

The arithmetic unit 905, using a twisted pseudo-random function tPRF( ), calculates encrypted secondary random tapes r2 and r3 as r2=tPRF(BSkA, R2) and r3=tPRF(BSkA, R3), respectively. The storage unit 904 saves not only the primary random tape R1 as a session number sidA but also the device identifiers IDA and IDB of both key exchange devices establishing a session and the primary random tapes R2 and R3.

The key encapsulation processing unit 906, based on the secondary random tape r2, generates a Kem public key KemPk and Kem secret key KemSk as (KemPk, KemSk) =KemGen(r2) and transmits a message including the Kem public key KemPk to the key exchange device 210B, which is the other party of key exchange. On the other hand, the key encapsulation processing unit 906 generates a session key K based on a message including a Kem ciphertext KemC received from the key exchange device 210B, which is the other party of key exchange, as K=KemDec(KemSk, KemC).

The verification processing unit 907 verifies the message, which includes a signature sigB and is transmitted from the key exchange device 210B, which is the other party of key exchange, by Verify(SVkB, (IDA, IDB, sidB, KemPk, Kemc), sigB) using a verification key SVkB, which is a public key of the key exchange device 210B, to verify the signature sigB. On the other hand, the verification processing unit 907 generates a signature sigA by Sign(SSkA, (IDA, IDB, sidA, sidB, KemPk), r3) using the signature key SSkA and the secondary random tape r3 and transmits a transmission message including the signature sigA to the key exchange device 210B, which is the other party of key exchange.

The output unit 908 outputs the decrypted session key K and session information IDA, IDB, sidA, and sidB for starting a session.

<<Processing Procedure of Key Exchange Device 210A>>

FIG. 9B is a flowchart illustrating a processing procedure of the key exchange device 210A as a key exchange request device according to the present exemplary embodiment. The flowchart is stored in storage in the key exchange device 210A. A CPU in the key exchange device 210A executing the flowchart using a RAM achieves the components in FIG. 9A.

The key exchange device 210A performs initial setup in step S901. For example, the key exchange device 210A generates a long-term secret key SkA, a public key PkA, and the like. To the key exchange device 210A, primary random tapes R1, R2, and R3 are input in step S903. The key exchange device 210A sets the random tape R1 as a session number sidA in step S905. The key exchange device 210A generates a secondary random tape r2 based on the random tape R2 as r2=tPRF(BSkA, R2). The key exchange device 210A generates a Kem public key KemPk and a Kem secret key KemSk using KemGen(r2) in step S907. The key exchange device 210A transmits a message (IDA, IDB, sidA, KemPk) to the key exchange device 210B, which is the other party of key exchange, in step S909. The key exchange device 210A saves (sidA, IDA, IDB, R2, R3) as a session state in step S911.

The key exchange device 210A stands by for a response message from the key exchange device 210B to the message transmitted in step S909, in step S913. When a response message from the key exchange device 210B arrives, the key exchange device 210A acquires the response message (IDA, IDB, sidA, sidB, KemC, sigB) in step S915. Next, the key exchange device 210A regenerates the encrypted secondary random tapes r2 and r3 using the pseudo-random function tPRF( ) in step S917, and regenerates the Kem public key KemPk and the Kem secret key KemSk using KemGen(r2) in step S919.

The key exchange device 210A reads a public key PkB (SVkB) of the other party of key exchange by means of IDB, which is the device ID thereof, in step S921. The key exchange device 210A verifies a signature sigB in the message received from the key exchange device 210B using Verify(SVkB, (IDA, IDB, sidA, sidB, KemPk, KemC), sigB) in step S923. When the signature is verified, the key exchange device 210A decrypts the message received from the key exchange device 210B as K=KemDec(KemSk, KemC) to acquire a session key K in step S925.

Next, the key exchange device 210A generates a signature sigA for a matching message as sigA=Sign(SSkA, (IDA, IDB, sidA, sidB, KemPk), r3) in step S927. The key exchange device 210A transmits a message (IDA, IDB, sidA, sidB, sigA) to the key exchange device 210B, which is the other party of key exchange, in step S929. The key exchange device 210A outputs (IDA, IDB, sidA, sidB, K), which is the session key and session information, in step S931.

<<Configuration of Key Exchange Device 210B>>

FIG. 10A is a block diagram illustrating a configuration of the key exchange device 210B as a key exchange response device according to the present exemplary embodiment. The key exchange device 210B is a device on the side responding to the request for key exchange. The configuration in FIG. 10A corresponds to the configuration in FIG. 5 and the reference numbers of each component in both drawings are assigned in such a way that the last digits thereof coincide with each other.

The key exchange device 210B includes a communication control unit 1001, an initial setup unit 1002, an input unit 1003, an arithmetic unit 1005, and a storage unit 1004. The key exchange device 210B further includes a key encapsulation processing unit 1006, a verification processing unit 1007, and an output unit 1008. Since the outlines of the respective components were already described with reference to FIG. 5, a case of a key exchange device on the side responding to the request for key exchange will be described in FIG. 10A.

In the initial setup unit 1002, a verification key SVkB and signature key SSkB are generated using SymGen(R0B) and a secret key BSkB is generated using SymGen(R5). In the initial setup unit 1002, a pair (SSkB, BSkB) of the signature key and secret key and the verification key SVkB is set as a long-term secret key SkB and the verification key SVkB is set as a public key PkB.

Device identifiers IDA and IDB and a public key PkA of the other party of key exchange may further be acquired. To the input unit 1003, primary random tapes R4, R5, and R6 are input.

The arithmetic unit 1005, using a twisted pseudo-random function tPRF( ), calculates encrypted secondary random tapes r5 and r6 as r5=tPRF(BSkB, R5) and r6=tPRF(BSkB, R6), respectively. The storage unit 1004 saves not only the primary random tape R4 as a session number sidB but also the device identifiers IDA and IDB of both key exchange devices establishing a session, the primary random tape R5, and a Kem public key KemPk, which is generated and transmitted by the key exchange device 210A.

The key encapsulation processing unit 1006, based on the secondary random tape r5, generates a Kem ciphertext KemC and a key K as (KemC, K)=KemEnc(KemPk, r5) and transmits a message including KemC to the key exchange device 210A, which is the other party of key exchange.

The verification processing unit 1007 generates a signature sigB by Sign(SSkB, (IDA, IDB, sidA, sidB, KemPk, KemC), r6) using the signature key SSkB and the secondary random tape r6 and transmits a transmission message including the signature sigB to the key exchange device 210A, which is the other party of key exchange. On the other hand, the verification processing unit 1007 verifies a message, which includes the signature sigA and is transmitted from the key exchange device 210A, which is the other party of key exchange, by Verify(SVkA, (IDA, IDB, sidB, KemPk), sigA) using a verification key SVkA, which is a public key of the key exchange device 210A, to verify the signature sigA.

The output unit 1008 outputs the generated session key K and the session information IDA, IDB, sidA, and sidB for starting a session.

<<Processing Procedure of Key Exchange Device B>>

FIG. 10B is a flowchart illustrating a processing procedure of the key exchange device 210B as a key exchange response device according to the present exemplary embodiment. The flowchart is stored in storage in the key exchange device 210B. A CPU in the key exchange device 210B executing the flowchart using a RAM achieves the components in FIG. 10A.

The key exchange device 210B performs initial setup in step S1001. For example, the key exchange device 210B generates a long-term secret key SkB, a public key PkB, and the like. The key exchange device 210B stands by for a message from a key exchange device requesting key exchange with the key exchange device 210B in step S1003. For example, when a message from the key exchange device 210A is received, the key exchange device 210B acquires the received message (IDA, IDB, sidA, KemPk) in step S1005.

To the key exchange device 210B, primary random tapes R4, R5, and R6 are input in step S1007. The key exchange device 210B sets the random tape R4 as a session number sidB in step S1009. The key exchange device 210B generates secondary random tapes r5 and r6 based on the random tapes R5 and R6 as r5=tPRF(BSkB, R5) and r6=tPRF(BSkB, R6), respectively. The key exchange device 210B, based on the Kem public key KemPk included in the received message (IDA, IDB, sidA, KemPk) and the secondary random tape r5, generates a Kem ciphertext KemC and a key K as (KemC, K)=KemEnc(KemPk, r5) in step S1011.

Next, the key exchange device 210B generates a signature sigB of a message as sigB=Sign(SSkB, (IDA, IDB, sidA, sidB, KemPk, KemC), r6) in step S1013. The key exchange device 210B transmits a message (IDA, IDB, sidA, sidB, KemC, sigB) to the key exchange device 210A, which has requested key exchange, in step S1015. The key exchange device 210B saves (IDA, IDB, sidA, sidB, KemPk, R5) as a session state in step S1017.

The key exchange device 210B stands by for a response from the key exchange device 210A to the message transmitted in step S1015, in step S1019. When a response from the key exchange device 210B arrives, the key exchange device 210B acquires the received message (IDA, IDB, sidA, sigA) in step S1021. The key exchange device 210B reads a public key PkA (SVkA) of the other party of key exchange by means of IDA, which is the device ID thereof, in step S1023. The key exchange device 210B verifies the signature sigA in the message received from the key exchange device 210A using Verify(SVka, (IDA, IDB, sidA, sidB, KemPk), sigA) in step S1025.

When the signature is verified, the key exchange device 210B regenerates the encrypted secondary random tape r5 using pseudo-random function tPRF( ) and also regenerates a Kem ciphertext KemC and a key K as (KemC, K)=KemEnc(KemPk, r5) in step S1027. The key exchange device 210B outputs (IDA, IDB, sidA, sidB, K), which are the session key and session information, in step S1029.

The present exemplary embodiment enables a session key to be concealed from an attacker unless a random tape and a long-term secret key of an identical key exchange device are stolen by the attacker. Furthermore, even when an attacker has impersonated one of key exchange devices to intercept encrypted data from the other of the key exchange devices and has stolen a long-term secret key of the impersonated device, it is possible to conceal the session key from the attacker.

That is, when the key exchange devices 210A and 210B have established a session key in key exchange of the present exemplary embodiment, the session key KeyA=KeyB is concealed from an attacker unless an event occurs that both a random tape eskA and a long-term key SkA are stolen from the key exchange device 210A by the attacker. Alternatively, the session key KeyA=KeyB is concealed from an attacker unless an event occurs that both a random tape eskB and a long-term key SkB are stolen from the key exchange device 210B by the attacker.

The above advantage is elaborated as follows. First, because of a feature that the key exchange device 210A generates r2 as r2=tPRF(BSkA, R2), it is derived from characteristics of a twisted pseudo-random function tPRF that r2 cannot be obtained unless both the random tape eskA including R2 and the long-term key SkA including BSkA are stolen. When r2 is concealed, KemSk is also concealed because of the safety of the key encapsulation function.

Next, because of a feature that the key exchange device 210B generates r5 as r5=tPRF(BSkB,R5), it is derived from characteristics of a twisted pseudo-random function tPRF that r5 cannot be obtained unless both the random tape eskB including R5 and the long-term key SkB including BSkB are stolen. When r5 is concealed, K in (KemC, K)=KemEnc(KemPk, r5) is concealed from anyone except a person who knows KemSk because of the safety of the key encapsulation function.

Because of the above-described two features, K is concealed from an attacker unless an event occurs that both the random tape eskA and the long-term key SkA are stolen from the key exchange device 210A by the attacker or both the random tape eskB and the long-term key SkB are stolen from the key exchange device 210B by the attacker.

In the key exchange method of the present exemplary embodiment, a case is assumed in which the key exchange device 210A communicates with an attacker who impersonates the key exchange device 210B and has established a session key. Even in that case, the session key KeyA is concealed from the attacker unless an event occurs that both a random tape eskA and a long-term key SkA are stolen from the key exchange device 210A by the attacker or a long-term key of the key exchange device 210B is stolen by the attacker even before the session is established.

The above advantage is elaborated as follows. First, because of a feature that the key exchange device 210A generates r2 as r2=tPRF(BSkA, R2), it is derived from characteristics of a twisted pseudo-random function tPRF that r2 cannot be obtained unless both the random tape eskA including R2 and the long-term key SkA including BSkA are stolen. When r2 is concealed, KemSk is also concealed because of the safety of the key encapsulation function.

Next, the key exchange device 210A verifies that sigB is a proper signature for (A, B, sidA, sidB, KemPk, KemC) signed by the key exchange device 210B. Therefore, because of the safety of the signature, it is ensured that the long-term key of the key exchange device 210B has not been stolen by an attacker before the session is established. Because r5 is obtained as r5=tPRF(BSkB, R5), r5 is concealed, and, because of the safety of the key encapsulation function, K in (KemC, K)=KemEnc(KemPk, r5) is concealed from anyone except a person who knows KemSk.

Because of the above-described two features, a session key is concealed from an attacker even when the key exchange device 210A communicates with the attacker who impersonates the key exchange device 210B and has established the session key. That is, it is confirmed that the session key KeyA is concealed from an attacker unless an event occurs that both the random tape eskA and the long-term key SkA are stolen from the key exchange device 210A by the attacker or the long-term key of the key exchange device 210B is stolen by the attacker even before the session is established.

On the other hand, in the key exchange method of the present exemplary embodiment, a case is also assumed in which the key exchange device 210B communicates with an attacker who impersonates the key exchange device 210A and has established a session key. Even in that case, the session key KeyB is concealed from the attacker unless an event occurs that both a random tape eskB and a long-term key SkB are stolen from the key exchange device 210B by the attacker or a long-term key of the key exchange device 210A is stolen by the attacker even before the session is established.

The above advantage is elaborated as follows. First, based on a feature that the key exchange device 210B generates r5 as r5=tPRF(BSkB, R5) and characteristics of a twisted pseudo-random function tPRF, it is derived that r5 cannot be obtained unless both the random tape eskB including R5 and the long-term key SkB including BSkB are stolen. Because of the safety of the key encapsulation function, K in (KemC, K)=KemEnc(KemPk, r5) is concealed from anyone except a person who knows r5 or KemSk.

Next, the key exchange device 210B verifies that sigA is a proper signature for (A, B, sidA, sidB, KemPk) signed by the key exchange device 210A. Therefore, because of the safety of the signature, it is ensured that the long-term key of the key exchange device 210A has not been stolen by an attacker before the session is established. Because r2 is obtained as r2=tPRF(BSkA, R2), r2 is concealed, and, because of the safety of the key encapsulation function, KemSk is concealed.

Because of the above-described two features, a session key is concealed from an attacker even when the key exchange device 210B communicates with the attacker who impersonates the key exchange device 210A and has established the session key. That is, it is confirmed that a session key KeyB is concealed from an attacker unless an event occurs that both the random tape eskB and the long-term key SkB are stolen from the key exchange device 210B by the attacker. Alternatively, it is confirmed that a session key KeyB is concealed from an attacker unless an event occurs that the long-term key of the key exchange device 210A is stolen by the attacker even before the session is established.

As described thus far, using the second exemplary embodiment of the present invention enables a session key to be concealed from an attacker when a secret session key is established for each session between two key exchange devices that include means for authenticating each other. In particular, the second exemplary embodiment provides an advantageous effect that the number of session keys to be leaked is reduced when there is a possibility that a long-term key that each key exchange device holds for performing authentication and a random tape that is used when each key exchange device generates a session key in cooperation with a key exchange device that is the other party of key exchange are leaked. Specifically, the number of cases in each of which, when two key exchange devices have established a session key or a key exchange device has generated a session key for a session with another key exchange device at a certain point of time, an attacker obtains the session key is reduced. That is, when, sometime after the point of time, data on generation of the session key are leaked to an attacker from the key exchange device or another key exchange device with which a session key has been established, chances are reduced that the attacker obtains the session key. The advantage also applies to a case in which data on generation of a session key are leaked to an attacker from a key exchange device with which the key exchange device has generated the session key.

A key exchange device capable of concealing a session key from an attacker as described above contributes to improving safety in communication.

Other Exemplary Embodiment

Although, in the above-described exemplary embodiments, a case of using a twisted pseudo-random function tPRF( ) as a pseudo-random function used in the arithmetic unit was described, using a hash function or a general pseudo-random function also provides the same advantageous effects. Although a case of using Sign( ) as a signature function was described, MAC (Message Authentication Code), which is a message authentication code, may be used when the key exchange device 210A and the key exchange device 210B share the same key. Although Verify( ), which corresponds to Sign( ) was used as a verification function, various types of signature functions that correspond to each other may be used.

The present invention was described above through exemplary embodiments thereof, but the present invention is not limited to the above exemplary embodiments. Various modifications that could be understood by a person skilled in the art may be applied to the configurations and details of the present invention within the scope of the present invention. A system or device formed by combining separate features included in the respective exemplary embodiments in any form is also included in the scope of the present invention.

The present invention may be applied to a system including a plurality of devices or a single device. The present invention is also applicable to a case in which a control program for implementing the functions of the exemplary embodiments is supplied to the system or device directly or from a remote site. Hence, a program installed in a computer to make the computer achieve the functions of the present invention, a medium storing the program, and a WWW (World Wide Web) server for downloading the program are also included in the scope of the present invention. In particular, at least a non-transitory computer readable medium storing a program making a computer execute processing steps included in the above-described exemplary embodiments is included in the scope of the present invention.

In the drawings for descriptions of configurations of key exchange devices in the above-described exemplary embodiments, arrows between respective components, among connections between respective components, indicate transmission and reception of information illustrated in the drawings. It is assumed that other information, such as a control signal, a notification, and the like, that is not illustrated in the drawings is transmitted and received between components regardless of whether or not being illustrated by arrows in the drawings.

[Other Descriptions of Exemplary Embodiments]

All or part of the exemplary embodiments described above may be described as in the following supplemental notes, but the present invention is not limited thereto.

(Supplemental Note 1)

A key exchange device, including:

an initial setup unit that generates a verification key that serves as a public key and a signature key based on a discretionary random tape, a session identifier based on a first random tape, and a secret key based on a second random tape;

an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;

a key encapsulation processing unit that generates a key-encapsulated public key and a key-encapsulated secret key based on the encrypted second random tape to transmit the key-encapsulated public key to an other party of key exchange, and decrypting a session key using the key-encapsulated public key and a key-encapsulated ciphertext received from the other party of key exchange; and a verification processing unit that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received.

(Supplemental Note 2)

The key exchange device according to Supplemental note 1, wherein the verification processing unit includes, in the transmission message, device identifiers of both key exchange devices, session identifiers of the both key exchange devices, and the key-encapsulated public key and, in the received message, the device identifiers of the both key exchange devices, the session identifiers of the both key exchange devices, the key-encapsulated public key, and the key-encapsulated ciphertext.

(Supplemental Note 3)

The key exchange device according to supplemental note 1 or 2, further including:

a session state storage unit that saves a session state for identifying a session; and a session information output unit that outputs a generated session key and session information including the session state.

(Supplemental Note 4)

A key exchange device, including:

an initial setup unit that generates a verification key that serves as a public key and a signature key based on a discretionary random tape, a session identifier based on a first random tape, and a secret key based on a second random tape;

an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;

a key encapsulation processing unit that encrypts a key-encapsulated public key received from an other party of key exchange and the encrypted second random tape to generate a key-encapsulated ciphertext and a session key and transmitting the generated key-encapsulated ciphertext to the other party of key exchange; and a verification processing unit that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received.

(Supplemental Note 5)

The key exchange device according to Supplemental note 4, wherein the verification processing unit includes, in the transmission message, device identifiers of both key exchange devices, session identifiers of the both key exchange devices, the key-encapsulated public key, and the key-encapsulated ciphertext and, in the received message, the device identifiers of the both key exchange device, the session identifiers of the both key exchange device, and the key-encapsulated public key.

(Supplemental Note 6)

The key exchange device according to supplemental note 4 or 5, further including:

a session state storage unit that saves a session state for identifying a session; and a session information output unit that outputs a generated session key and session information including the session state.

(Supplemental Note 7)

A key exchange device, including:

an initial setup unit that generates a verification key that serves as a public key and a signature key based on a discretionary random tape, a session identifier based on a first random tape, and a secret key based on a second random tape;

an arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;

a key encapsulation processing unit that generates a key-encapsulated public key and a key-encapsulated secret key based on the encrypted second random tape to transmit the key-encapsulated public key to an other party of key exchange, decrypting a session key using the key-encapsulated public key and a key-encapsulated ciphertext received from the other party of key exchange, encrypting a key-encapsulated public key received from the other party of key exchange and the encrypted second random tape to generate a key-encapsulated ciphertext and a session key, and transmits the generated key-encapsulated ciphertext to the other party of key exchange; and a verification processing unit that generates a signature based on the signature key, a transmission message and the encrypted third random tape, transmits the signature to the other party of key exchange and, verifies a signature received from the other party of key exchange based on a verification key that is a public key of the other party of key exchange, a received message and the signature received.

(Supplemental Note 8)

The key exchange device according to supplemental note 7, further including:

a session state storage unit that saves a session state for identifying a session; and a session information output unit that outputs a generated session key and session information including the session state.

(Supplemental Note 9)

A control method of a key exchange device, including:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

generating a key-encapsulated public key and a key-encapsulated secret key based on the encrypted second random tape to transmit the key-encapsulated public key to an other party of key exchange and decrypting a session key using the key-encapsulated public key and a key-encapsulated ciphertext received from the other party of key exchange; and generating a signature based on the signature key, a transmission message, and the encrypted third random tape, transmitting the signature to the other party of key exchange and verifying the signature received from the other party of key exchange based on a verification key that is a public key of the other party of key exchange, a received message and a received signature.

(Supplemental Note 10)

A recording medium for storing a control program of a key exchange device, the control program making a computer execute:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

generating a key-encapsulated public key and a key-encapsulated secret key based on the encrypted second random tape to transmit the key-encapsulated public key to an other party of key exchange and decrypting a session key using the key-encapsulated public key and a key-encapsulated ciphertext received from the other party of key exchange; and generating a signature based on the signature key, a transmission message and the encrypted third random tape, transmitting the signature to the other party of key exchange and verifying a signature received from the other party of key exchange based on a verification key that is a public key of the other party of key exchange, a received message and the signature received.

(Supplemental Note 11)

A control method of a key exchange device, the method including:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

encrypting a key-encapsulated public key received from an other party of key exchange and the encrypted second random tape to generate a key-encapsulated ciphertext and a session key and transmitting the generated key-encapsulated ciphertext to the other party of key exchange; and generating the signature based on the signature key, a transmission message and the encrypted third random tape, transmitting the signature to the other party of key exchange and verifying a signature received from the other party of key exchange based on a verification key that is a public key of the other party of key exchange, a received message and the received signature.

(Supplemental Note 12)

A recording medium storing a control program of a key exchange device, the control program making a computer execute:

generating a verification key that serves as a public key and a signature key based on a discretionary random tape, a session identifier based on a first random tape, and a secret key based on a second random tape;

generating an encrypted second random tape by an arithmetic operation of a pseudo-random function having the second random tape and the secret key as variables and an encrypted third random tape by an arithmetic operation of the pseudo-random function having a third random tape and the secret key as variables;

encrypting a key-encapsulated public key received from an other party of key exchange and the encrypted second random tape to generate a key-encapsulated ciphertext and a session key and transmitting the generated key-encapsulated ciphertext to the other party of key exchange; and generating a signature based on the signature key, a transmission message and the encrypted third random tape, transmitting the signature to the other party of key exchange and verifying a signature received from the other party of key exchange based on a verification key that is a public key of the other party of key exchange, a received message and the signature received.

(Supplemental Note 13)

A key exchange system, including:

a first key exchange device that requests key exchange; and a second key exchange device that responds to the request for key exchange, wherein the first key exchange device includes:

a first initial setup unit that generates a verification key that serves as a public key and a signature key based on a discretionary random tape, a session identifier based on a first random tape, and a secret key based on a second random tape;

a first arithmetic unit that generates an encrypted second random tape by an arithmetic operation of a pseudo-random function having the second random tape and the secret key as variables and an encrypted third random tape by an arithmetic operation of the pseudo-random function having a third random tape and the secret key as variables;

a first key encapsulation processing unit that generates a key-encapsulated public key and a key-encapsulated secret key based on the encrypted second random tape to transmit the key-encapsulated public key to the second key exchange device and decrypting a session key using the key-encapsulated public key and a key-encapsulated ciphertext received from the second key exchange device; and a first verification processing unit that generates a signature based on the signature key, a transmission message and the encrypted third random tape, transmits the signature to the second key exchange device and verifies a signature received from the other party of key exchange based on a verification key that is a public key of the second key exchange device, a received message and the signature received, and the second key exchange device includes:

a second initial setup unit that generates a verification key that serves as a public key and a signature key based on a discretionary random tape, a session identifier based on a fourth random tape, and a secret key based on a fifth random tape;

an arithmetic unit that generates an encrypted fifth random tape by an arithmetic operation of a pseudo-random function having the fifth random tape and the secret key as variables and an encrypted sixth random tape by an arithmetic operation of the pseudo-random function having a sixth random tape and the secret key as variables;

a second key encapsulation processing unit that encrypts a key-encapsulated public key received from an other party of key exchange and the encrypted fifth random tape to generate a key-encapsulated ciphertext and a session key and transmits the generated key-encapsulated ciphertext to the first key exchange device; and a second verification processing unit that generates a signature based on the signature key, a transmission message and the encrypted sixth random tape, transmits the signature to the first key exchange device and verifies a signature received from the first key exchange device based on a verification key that is a public key of the first key exchange device, a received message and the signature received.

(Supplemental Note 14)

A key exchange method of a key exchange system that includes a first key exchange device that requests key exchange and a second key exchange device that responds to the request for key exchange, the method including:

by the first key exchange device, generating a verification key that serves as a public key and a signature key based on a discretionary random tape, a session identifier based on a first random tape, and a secret key based on a second random tape;

by the first key exchange device, generating an encrypted second random tape by an arithmetic operation of a pseudo-random function having the second random tape and the secret key as variables and an encrypted third random tape by an arithmetic operation of the pseudo-random function having a third random tape and the secret key as variables;

by the first key exchange device, generating a key-encapsulated public key and a key-encapsulated secret key based on the encrypted second random tape and transmitting the key-encapsulated public key to the second key exchange device;

by the second key exchange device, when receiving a key-encapsulated public key from the second key exchange device, generating a verification key that serves as a public key and a signature key based on a discretionary random tape, a session identifier based on a fourth random tape, and a secret key based on a fifth random tape;

by the second key exchange device, generating an encrypted fifth random tape by an arithmetic operation of a pseudo-random function having the fifth random tape and the secret key as variables and an encrypted sixth random tape by an arithmetic operation of the pseudo-random function having a sixth random tape and the secret key as variables;

by the second key exchange device, encrypting a key-encapsulated public key received from the first key exchange device and the encrypted fifth random tape to generate a key-encapsulated ciphertext and a session key and transmitting the generated key-encapsulated ciphertext to the first key exchange device;

by the second key exchange device, generating a signature based on the signature key, a transmission message and the encrypted sixth random tape, transmitting the signature to the first key exchange device;

by the first key exchange device, decrypting a session key using the key-encapsulated public key and a key-encapsulated ciphertext received from the second key exchange device;

by the first key exchange device, generating a signature based on the signature key, a transmission message and the encrypted third random tape, transmitting the signature to the second key exchange device and verifying a signature received from the second key exchange device based on a verification key that is a public key of the second key exchange device, a received message and the signature received; and by the second key exchange device, verifying a signature received from the first key exchange device based on a verification key that is a public key of the first key exchange device, a received message and the signature received.

This application claims priority based on Japanese Patent Application No. 2014-108626, filed on May 26, 2014, the entire disclosure of which is incorporated herein by reference.

The invention claimed is:
1. A key exchange device, comprising:
an initial setup unit, implemented by at least one processor, that generates a verification key that serves as a public key and a signature key based on a discretionary random tape, a session identifier based on a first random tape, and a secret key based on a second random tape;
an arithmetic unit, implemented by the at least one processor, that generates an encrypted second random tape by an arithmetic operation of a pseudo-random function having the second random tape and the secret key as variables and an encrypted third random tape by an arithmetic operation of the pseudo-random function having a third random tape and the secret key as variables;
a key encapsulation processing unit, implemented by the at least one processor, that generates a key-encapsulated public key and a key-encapsulated secret key based on the encrypted second random tape to transmit the key-encapsulated public key to another party of key exchange, and decrypts a session key using the key-encapsulated public key and a key-encapsulated ciphertext received from the other party of key exchange;
a verification processing unit, implemented by the at least one processor, that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received;
a session state storage unit, implemented by the at least one processor, that saves a session state for identifying a session; and
a session information output unit, implemented by the at least one processor, that outputs a generated session key and session information including the session state.

2. A key exchange device, comprising:
an initial setup unit, implemented by at least one processor, that generates a verification key that serves as a public key and a signature key based on a discretionary random tape, a session identifier based on a first random tape, and a secret key based on a second random tape;
an arithmetic unit, implemented by the at least one processor, that generates an encrypted second random tape by an arithmetic operation of a pseudo-random function having the second random tape and the secret key as variables and an encrypted third random tape by an arithmetic operation of the pseudo-random function having a third random tape and the secret key as variables;
a key encapsulation processing unit, implemented by the at least one processor, that generates a key-encapsulated public key received from another party of key exchange and the encrypted second random tape to generate a key-encapsulated ciphertext and a session key and transmits the generated key-encapsulated ciphertext to the other party of key exchange;
a verification processing unit, implemented by the at least one processor, that generates a signature based on the signature key, a transmission message and the encrypted third random tape, transmits the signature to the other party of key exchange and verifies a signature received from the other party of key exchange based on a verification key that is a public key of the other party of key exchange, a received message and the signature received;

a session state storage unit, implemented by the at least one processor, that saves a session state for identifying a session; and a session information output unit, implemented by the at least one processor, that outputs a generated session key and session information including the session state.

3. A key exchange device, comprising:

an initial setup unit, implemented by at least one processor, that generates a verification key that serves as a public key and a signature key based on a discretionary random tape, a session identifier based on a first random tape, and a secret key based on a second random tape;

an arithmetic unit, implemented by the at least one processor, that generates an encrypted second random tape by an arithmetic operation of a pseudo-random function having the second random tape and the secret key as variables and an encrypted third random tape by an arithmetic operation of the pseudo-random function having a third random tape and the secret key as variables;

a key encapsulation processing unit, implemented by the at least one processor, that generates a key-encapsulated public key and a key-encapsulated secret key based on the encrypted second random tape to transmit the key-encapsulated public key to another party of key exchange, decrypts a session key using the key-encapsulated public key and a key-encapsulated ciphertext received from the other party of key exchange, encrypts a key-encapsulated public key received from the other party of key exchange and the encrypted second random tape to generate a key-encapsulated ciphertext and a session key, and transmits the generated key-encapsulated ciphertext to the other party of key exchange;

a verification processing unit, implemented by the at least one processor, that generates a signature based on the signature key, a transmission message and the encrypted third random tape, transmits the signature to the other party of key exchange and, verifies a signature received from the other party of key exchange based on a verification key that is a public key of the other party of key exchange, a received message and the signature received;

a session state storage unit, implemented by the at least one processor, that saves a session state for identifying a session; and a session information output unit, implemented by the at least one processor, that outputs a generated session key and session information including the session state.

* * * * *

UNITED STATES PATENT AND TRADEMARK OFFICE
CERTIFICATE OF CORRECTION

PATENT NO. : 9,917,692 B2
APPLICATION NO. : 15/313124
DATED : March 13, 2018
INVENTOR(S) : Jun Furukawa It is certified that error appears in the above-identified patent and that said Letters Patent is hereby corrected as shown below:

In the Specification

Column 11, Description of Embodiments, Line 43: "KeyA'=Hash2(epB'SkA," has been replaced with --KeyA'=Hash2(epB'$^{SkA}$,-- therefor Column 15, Description of Embodiments, Line 24: "X," has been replaced with --λ,-- therefor Column 23, Description of Embodiments, Line 62: After "Sign( )", insert --,--

Signed and Sealed this
Twenty-second Day of January, 2019

Andrei Iancu
*Director of the United States Patent and Trademark Office*